(12) United States Patent
Lyons et al.

(10) Patent No.: US 10,519,603 B2
(45) Date of Patent: Dec. 31, 2019

(54) COATING COMPOSITION AND COATED PAPER AND COATED PAPERBOARD

(71) Applicant: Imerys USA, Inc., Roswell, GA (US)

(72) Inventors: Anthony Lyons, Macon, GA (US); Chinmay Peshave, Milledgeville, GA (US)

(73) Assignee: Imerys USA, Inc., Roswell, GA (US)

( * ) Notice: Subject to any disclaimer, the term of this patent is extended or adjusted under 35 U.S.C. 154(b) by 0 days.

(21) Appl. No.: 16/422,166

(22) Filed: May 24, 2019

(65) Prior Publication Data

US 2019/0284763 A1   Sep. 19, 2019

Related U.S. Application Data

(60) Continuation of application No. 15/334,038, filed on Oct. 25, 2016, which is a division of application No. 14/370,285, filed as application No. PCT/US2013/064293 on Oct. 10, 2013, now abandoned.

(60) Provisional application No. 61/787,222, filed on Mar. 15, 2013, provisional application No. 61/715,628, filed on Oct. 18, 2012.

(51) Int. Cl.

| | |
|---|---|
| C09D 1/00 | (2006.01) |
| D21H 19/64 | (2006.01) |
| C09D 7/43 | (2018.01) |
| D21H 19/38 | (2006.01) |
| C09D 133/08 | (2006.01) |
| D21H 19/40 | (2006.01) |
| D21H 19/54 | (2006.01) |
| D21H 19/58 | (2006.01) |
| D21H 19/60 | (2006.01) |
| C09D 103/02 | (2006.01) |
| C09D 131/04 | (2006.01) |
| C09D 133/00 | (2006.01) |
| C09C 1/02 | (2006.01) |
| C09D 101/32 | (2006.01) |
| C09D 101/28 | (2006.01) |
| D21H 21/52 | (2006.01) |
| D21H 21/50 | (2006.01) |
| C09D 7/61 | (2018.01) |
| C08K 3/34 | (2006.01) |
| C08K 5/098 | (2006.01) |
| C08K 3/26 | (2006.01) |

(52) U.S. Cl.
CPC ............. *D21H 19/64* (2013.01); *C09C 1/021* (2013.01); *C09D 1/00* (2013.01); *C09D 7/43* (2018.01); *C09D 7/61* (2018.01); *C09D 101/286* (2013.01); *C09D 101/32* (2013.01); *C09D 103/02* (2013.01); *C09D 131/04* (2013.01); *C09D 133/00* (2013.01); *C09D 133/08* (2013.01); *D21H 19/385* (2013.01); *D21H 19/40* (2013.01); *D21H 19/54* (2013.01); *D21H 19/58* (2013.01); *D21H 19/60* (2013.01); *D21H 21/50* (2013.01); *D21H 21/52* (2013.01); *C08K 3/26* (2013.01); *C08K 3/346* (2013.01); *C08K 5/098* (2013.01); *C08K 2003/265* (2013.01); *Y10T 428/258* (2015.01)

(58) Field of Classification Search
CPC ........ D21H 19/64; D21H 21/50; D21H 21/52; D21H 19/60; D21H 19/58; D21H 19/54; D21H 19/40; D21H 19/385; C09D 7/61; C09D 101/286; C09D 101/32; C09D 133/00; C09D 131/04; C09D 103/02; C09D 133/08; C09D 1/00; C09D 7/43; C09C 1/021; C08K 3/26; C08K 5/098; C08K 3/346; C08K 2003/265; Y10T 428/258

See application file for complete search history.

(56) References Cited

U.S. PATENT DOCUMENTS

| | | | |
|---|---|---|---|
| 5,128,606 | A | 7/1992 | Gate et al. |
| 5,880,117 | A | 3/1999 | Arnold |
| 6,616,749 | B1 | 9/2003 | Husband et al. |
| 7,744,688 | B2 | 6/2010 | Skuse et al. |

(Continued)

FOREIGN PATENT DOCUMENTS

| | | |
|---|---|---|
| WO | WO 99/51815 | 10/1999 |
| WO | WO 01/53893 A1 | 7/2001 |
| WO | WO 2014/062476 A1 | 4/2014 |

OTHER PUBLICATIONS

International Search Report and Written Opinion dated Dec. 6, 2013, in PCT International Application No. PCT/US2013/064293, filed Oct. 10, 2013.

*Primary Examiner* — Alexander C Kollias
(74) *Attorney, Agent, or Firm* — Finnegan, Henderson, Farabow, Garrett & Dunner, LLP

(57) ABSTRACT

A coating composition may include kaolin having a shape factor less than about 70 and calcium carbonate, wherein less than about 90% by weight and greater than about 60% by weight of particles of the calcium carbonate have an equivalent spherical diameter (esd) less than 2 microns. The coating composition may include a thickener present in an amount ranging from about 0.1% to about 0.9% by active dry weight of the composition. A coating composition may include kaolin having a shape factor less than about 70 and calcium carbonate having a mean particle size (d50) of at least about 2.4 microns and a steepness factor of at least about 30. The coating composition may be a paper basecoat composition or a paperboard basecoat composition. A paper or paperboard product may include the coating composition on at least one surface of the paper product or paperboard product.

18 Claims, 11 Drawing Sheets

(56) References Cited

U.S. PATENT DOCUMENTS

| | | |
|---|---|---|
| 8,142,887 B2 | 3/2012 | Fugitt et al. |
| 2002/0164464 A1 | 11/2002 | Monie |
| 2003/0094120 A1 | 3/2003 | Golley et al. |
| 2003/0113532 A1* | 6/2003 | Cummings ............... C09C 1/42 428/328 |
| 2005/0039871 A1 | 2/2005 | Urscheler et al. |
| 2006/0102304 A1 | 5/2006 | Nutbeem et al. |
| 2006/0124033 A1 | 6/2006 | Pruett et al. |
| 2006/0292305 A1 | 12/2006 | Skuse et al. |
| 2008/0145620 A1 | 6/2008 | Sahlberg et al. |
| 2008/0168925 A1* | 7/2008 | Sare ....................... C01F 11/18 106/462 |
| 2008/0308010 A1 | 12/2008 | Rainer et al. |
| 2009/0170994 A1 | 7/2009 | McConnell et al. |

\* cited by examiner $\partial max = PL^3 / 48 EI$

COATING COMPOSITION AND COATED PAPER AND COATED PAPERBOARD

CLAIM OF PRIORITY

This application is a continuation application of U.S. application Ser. No. 15/334,038, filed Oct. 25, 2016, which is a divisional application of U.S. application Ser. No. 14/370,285, filed Jul. 2, 2014, now abandoned, which is a U.S. national phase entry under 35 U.S.C. § 371 from PCT International Application No. PCT/US2013/064293, filed Oct. 10, 2013, which claims the benefit of priority of U.S. Provisional Application Nos. 61/787,222, filed Mar. 15, 2013, and 61/715,628, filed Oct. 18, 2012, the subject matter of both of which is incorporated herein by reference in their entireties.

Provisional Application Nos. 61/787,222, filed Mar. 15, 2013, and 61/715,628, filed Oct. 18, 2012, the subject matter of both of which is incorporated herein by reference in their entireties.

FIELD OF THE DISCLOSURE

The present disclosure relates to coating compositions, and more particularly, to coating compositions for paper and paperboard products.

BACKGROUND OF THE DISCLOSURE

Coatings may be applied on substrates to enhance the physical and optical properties of the substrate. For example, paper and paperboards used in the printing and converting industries may be subjected to a variety of operations, such as, for example, printing, cutting, creasing, folding, and/or gluing. Coated paperboards are widely used in the packaging industry, and a typical coating formulation may include one or more pigments, binders, and additives. Such coatings may serve to enhance physical, optical, and/or barrier properties of the products. Physical and/or optical properties may provide aesthetic appeal and/or functional benefits to packaging formed from the coated substrates. Paper and paperboard products may be very sensitive to moisture and moisture vapors, and barrier properties may provide a barrier against moisture, oil, water vapors, or gases.

Creasing and folding operations are important processes in the converting industry. However, creasing and folding may result in applying significant strains to the paper or paperboard substrates. Such strains challenge the mechanical strength of the substrates as well as any coating layers present on the substrates. For example, rupture occurring at creased and folded edges of the paper and paperboard products may weaken barrier properties of the substrate significantly and may diminish the overall aesthetic appeal of a packaging formed by the substrate. An inability to withstand these large strains may lead to rupture of folded edges, potentially resulting in large cracks or flaking-off of the coating layer or both.

Traditionally, coating layers with higher stiffness have been preferred, since higher stiffness coating layers may provide superior strength and/or reduction in the fiber usage for the substrate. However, stiffer coating layers may tend to increase the severity of cracking or flaking occurring at folded edges of paper or paperboards.

Therefore, it may be desirable to provide coating compositions that exhibit improved resistance to cracking and/or flaking when the substrates coated with the coating composition are folded, or improved performance when the substrates undergo printing or converting operations.

SUMMARY

In accordance with a first aspect, a coating composition may include kaolin having a shape factor less than about 70 and calcium carbonate, wherein less than about 90% by weight and greater than about 60% by weight of particles of the calcium carbonate have an equivalent spherical diameter (esd) less than 2 microns.

As used herein, "shape factor" is a measure of an average value (on a weight average basis) of the ratio of mean particle diameter to particle thickness for a population of particles of varying size and shape, as measured using the electrical conductivity method and apparatus described in, for example, U.S. Pat. No. 5,128,606, and using the equations derived in its specification. "Mean particle diameter" is defined as the diameter of a circle, which has the same area as the largest face of the particle. The electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube. Using the difference between the two conductivity measurements, the shape factor of the particulate material under test may be determined.

"Particle size," as used herein, for example, in the context of particle size distribution (pad), may be measured in terms of equivalent spherical diameter (esd). Sometimes referred to as the "do" value, mean particle size and other particle size properties referred to in the present disclosure may be measured in a well-known manner, for example, by sedimentation of the particulate material in a fully-dispersed condition in an aqueous medium using a SEDIGRAPH 5100™ machine, as supplied by Micromeritics Corporation. Such a machine may provide measurements and a plot of the cumulative percentage by weight of particles having a size, referred to in the art as "equivalent spherical diameter" (esd), less than the given esd values. For example, the mean particle size $d_{50}$ is the value that may be determined in this way of the particle esd at which there are 50% by weight of the particles that have an esd less than that $d_{50}$ value.

According to another aspect, the coating composition may include a thickener. For example, the thickener may be present in an amount ranging from about 0.1% to about 0.9% by active dry weight of the composition, in an amount ranging from about 0.2% to about 0.6% by active dry weight of the composition, in an amount ranging from about 0.4% to about 0.9% by active dry weight of the composition, or in an amount ranging from about 0.4% to about 0.6% by active dry weight of the composition. According to a further aspect, the thickener may be selected from the group consisting of alkali-soluble emulsion polyacrylate thickeners, hydrophobically-modified alkali-soluble emulsion polyacrylate thickeners, and CMC (carboxymethyl celluloses) thickeners.

According to still another aspect, less than about 30% by weight of the kaolin has an esd less than about 0.25 micron. For example, less than about 25% by weight of the kaolin has an esd less than about 0.25 micron, or less than about 20% by weight of the kaolin has an esd less than about 0.25 micron.

According to yet another aspect, the kaolin has a mean particle size ($d_{50}$) less than about 1 micron. According to another aspect, less than about 80% by weight of the kaolin has an esd less than about 1 micron. According to a further aspect, less than about 90% by weight of the kaolin has an esd less than about 2 microns.

According to still a further aspect, less than about 80% by weight and greater than about 60% by weight of the particles of the calcium carbonate have an esd less than 2 microns. For example, less than about 70% by weight and greater than about 60% by weight of the particles of calcium carbonate have an esd less than 2 microns.

According to yet another aspect, the coating composition is a paper basecoat composition or a paperboard basecoat composition. According to still a further aspect, a paper product or paperboard product may include a coating composition on at least one surface of the paper product or paperboard product, wherein the coating composition includes kaolin having a shape factor less than about 70 and calcium carbonate, wherein less than about 90% by weight and greater than about 60% by weight of particles of the calcium carbonate have an equivalent spherical diameter (esd) less than 2 microns.

In accordance with another aspect, a coating composition may include kaolin having a shape factor less than about 70, and calcium carbonate having a $d_0$ of at least about 2.4 microns and a steepness factor of at least about 30.

Particle size distribution (psd) of particulate material can also be characterized by a "steepness" or "steepness factor." The steepness factor is derived from the slope of a psd curve, where the particle diameter is plotted on the x-axis against a cumulative mass percentage of particles on the y-axis. A wide particle distribution has a relatively lower steepness factor, whereas a narrow particle size distribution gives rise to a relatively higher steepness factor. In some aspects, the steepness factor may be calculated as a ratio of:

$$[\text{steepness}] = \frac{d_{30}}{d_{70}} \times 100$$

i.e., the ratio of the particle size at a cumulative mass of less than 30% of the particles ($d_{30}$), to the particle size at a cumulative mass of less than 70% of the particles ($d_{70}$), as determined by a Sedigraph 5100, multiplied by 100. As the $d_{30}$ and $d_{70}$ values approach each other, the steepness factor increases.

According to yet another aspect, the mean particle size ($d_{50}$) of the calcium carbonate may be greater than about 2.6 microns, greater than about 2.8 microns, or greater than about 3.0 microns. According to a further aspect, the steepness factor (e.g., $d_{30}/d_{70} \times 100$) of the calcium carbonate may be greater than about 32, greater than about 34, greater than about 36, greater than about 40, or greater than about 43.

It is to be understood that both the foregoing general description and the following detailed description are exemplary and explanatory only and are not restrictive of the invention.

The accompanying drawings, which are incorporated in and constitute a part of this specification, serve to explain at least some principles of the invention.

DESCRIPTION OF EXEMPLARY EMBODIMENTS

Figure 1:
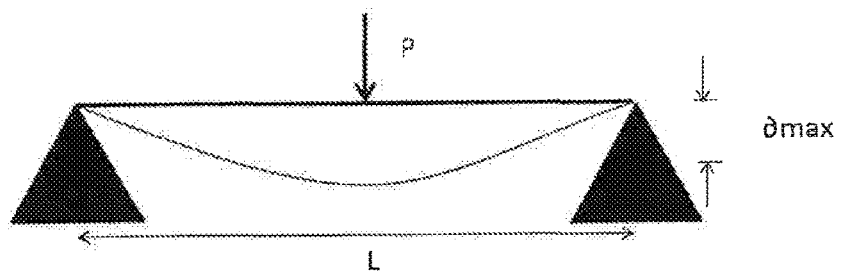
FIG. 1 is a schematic representation of a beam supported at its ends.

Reference will now be made in detail to exemplary embodiments of the invention.

Applicant has surprisingly determined that flaking and/or cracking sometimes associated with the fold of coated paper products and paperboard products may be reduced by a coating composition including a combination of kaolin and calcium carbonate. For example, a coating composition including kaolin having a shape factor of less than about 70 and calcium carbonate, wherein less than about 90% by weight and greater than about 60% by weight of particles of the calcium carbonate have an esd less than 2 microns, may result in reduced flaking and/or cracking at a fold of a paper product or paperboard product coated with the coating composition.

According to some embodiments, the coating composition may include a thickener, for example, a thickener present in an amount ranging from about 0.1% to about 0.9% by active dry weight of the composition. For example, the thickener may be selected from at least one of alkali-soluble emulsion polyacrylate thickeners, hydrophobically-modified alkali-soluble emulsion polyacrylate thickeners, and CMC (carboxymethyl celluloses) thickeners.

Not wishing to be bound by theory, it is believed that the packing structure of the coating layer provided by the coating composition according to at least some embodiments disclosed herein may result in improved modulus and stiffness of the coating, as well as improved (i.e., reduced)

flaking and/or cracking of the coating at the fold of paper and paperboard products. In particular, it is believed that surprisingly the shape factor of the kaolin, the coarseness of the calcium carbonate, and/or the amount of thickener in the coating composition improve the modulus and stiffness of the coated paper or paperboard product, and improve the flaking and cracking at the fold of the coated product. For example, a platy kaolin having a shape factor of less than 70 and a ground calcium carbonate (GCC) having a particle size distribution in which less than about 90% by weight of the GCC particles and greater than about 60% by weight of the GCC particles have an esd of less than 2 microns provides improvements in the modulus and stiffness of the coated product and improved flaking and/or cracking at the fold of the coated product. As used herein, "platy kaolin" means kaolin having a high shape factor. In addition, a thickener present in an amount ranging from about 0.1% to about 0.9% by active dry weight of the coating composition provides improvements in the modulus and stiffness of the coated product and improved flaking and/or cracking at the fold of the coated product. The shape factor of the kaolin, the particle size of the calcium carbonate, and the amount of the thickener may each individually be selected to improve the modulus and stiffness of the coated product, and the flaking and/or cracking at the fold of the coated product. Alternatively, the shape factor of the kaolin, the particle size of the calcium carbonate, and the amount of the thickener may be collectively selected to improve the modulus and stiffness of the coated product, and the flaking and/or cracking at the fold of the coated product.

According to some embodiments, the kaolin may be produced by, for example, treating a raw particulate hydrous kaolin mineral of the sedimentary type, for example, a raw or partially processed kaolin clay of the type which occurs in Georgia, USA. The processed kaolin may have a psd such that at least 80%, preferably at least 84%, by weight of the particles have an esd smaller than 2 micrometers (microns). In certain embodiments, the kaolin may have a psd such that not less than 12% by weight of the particles, preferably from 15% to 35%, especially 18% to 26%, have an esd smaller than 0.25 micron. Desirably, at least 60%, preferably at least 65% by weight have an esd less than 1 micron. The mean particle esd may be from 0.3 micron to 0.8 micron, especially from 0.5 micron to 0.7 micron.

According to some embodiments, the percentage by weight of the kaolin particles having an esd in the range from 0.75 micron to 0.25 micron of the pigment product according to the first aspect of the invention is 40% or greater, for example, from 40% to 50%. The shape factor of the processed kaolin may be at least 10, desirably at least 20, for example, from about 10 to about 70, or about 20 to about 70, or about 30 to about 70, or about 40 to about 70, about 50 to about 70, or about 60 to about 70.

According to some embodiments, the raw particulate hydrous kaolin may be processed to produce a kaolin pigment according to an exemplary method comprising the steps of: (a) mixing a raw or partially processed kaolin clay with water to form an aqueous suspension; (b) subjecting the suspension produced by step (a) to attrition grinding using a particulate grinding medium by a process in which the average shape factor of the kaolin clay is increased by at least 10, preferably at least 20; (c) separating the suspension of ground kaolin clay from the particulate grinding medium; (d) obtaining a coarse component by classifying, for example, using a centrifuge, and (e) dewatering the suspension of ground coarse kaolin clay separated in step (c) to recover a kaolin pigment therefrom.

According to some embodiments, in step (a) the kaolin clay may form from 20% to 70%, for example, from 20% to 45%, of the treated suspension. The kaolin clay may include a sedimentary kaolin clay, for example, a sedimentary kaolin clay from Georgia, USA. The raw kaolin clay may have a psd such that not more than about 40% by weight consists of particles having an esd larger than 10 microns and not more than 50% by weight, for example, from about 20% to about 40% by weight, consists of particles having an esd smaller than 2 microns. The shape factor of the kaolin clay treated in step (a) may be less than 15, for example, in the range of from about 5 to about 10. Thus, the shape factor may be increased by a differential of at least 30, for example, at least 40, for example, from a shape factor value of less than 15 to a shape factor value greater than 55 (e.g., a shape factor from about 60 or greater to less than about 70).

When preparing an aqueous suspension of the kaolin clay to be treated in step (a), according to some embodiments, a dispersing agent for the kaolin clay may or may not be added to the kaolin clay.

The kaolin clay processed in step (a) of the method according to some embodiments, may be a coarse component obtained from classifying, for example, using a centrifuge, a standard blocky sedimentary kaolin clay, for example, having a shape factor of from about 5 to about 10. The coarse component may have not more than 50% by weight of particles having an esd less than 2 microns and not more than 10% by weight having an esd less than 0.25 micron.

According to some embodiments, the psd of the kaolin clay may be adjusted by blending from about 99 to about 50 parts by weight of the kaolin clay with from about 1 to about 50 parts by weight, for example, from 10 to 30 parts by weight, of a fine platy kaolin component, in particular, a fine platy component having a shape factor of at least about 15, for example, from about 15 to about 40 and whose percentages by weight of particles smaller than 2 microns and 0.25 micron are respectively at least about 85% by weight and at least about 20% by weight. The fine platy kaolin component may be a kaolin derived from either a primary or a sedimentary deposit. According to some embodiments, the exemplary fine platy kaolin component may be added to the kaolin of or obtained from the coarse component prior to or after the grinding step (b). The addition may be carried out with the two kaolin components to be blended in either powdered, dry form, or in the form of an aqueous suspension.

It has been determined that by producing a kaolin product by blending in the manner described, the rheology and dewatering characteristics of an aqueous suspension of the kaolin processed in accordance with some exemplary embodiments are improved, for example, providing improved runnability and particle alignment when the kaolin is used in a coating composition.

According to some embodiments, the kaolin clay may be subjected to one or more well-known purification steps to remove undesirable impurities, for example, between steps (a) and (b). For example, the aqueous suspension of kaolin clay may be subjected to a froth flotation treatment operation to remove titanium containing impurities in the froth. Alternatively, or in addition, the suspension may be passed through a high intensity magnetic separator to remove iron containing impurities.

According to some embodiments, step (b) may include a process wherein the suspension of kaolin clay is treated by medium attrition grinding, for example, wherein an energy of from about 40 kWh to about 250 kWh per tonne of clay (on a dry weight basis) is dissipated in the suspension. According to some embodiments, step (b) may include a process including at least two stages, for example, a first stage (b1) wherein delamination of the kaolin clay occurs, and a second stage (b2) wherein comminution of the platelets of the kaolin clay occurs.

It has been found that it may be beneficial to subject the suspension of the kaolin clay to a relatively gentle comminution step (b1), for example, grinding using a particulate grinding medium in order to break down composite particles that are present in the raw kaolin clay. Such composite particles may generally include coherent stacks or blocks of individual hexagonal plate-like particles, particularly where the kaolin clay is from a sedimentary deposit. When the kaolin clay is subjected to relatively gentle comminution, for example, by grinding in step (b1), the composite particles are broken down to give the individual thin, substantially hexagonal plates. Such a process may generally be referred to as "delamination," and has the result of increasing the average shape factor of the kaolin clay. For example, this exemplary process may increase the shape factor of the kaolin clay from a starting shape factor of about 5 to about 10 to an increased shape factor of at least about 50 to 55 (e.g., from about 60 to less than about 70). As used herein, "relatively gentle grinding" means grinding in an attrition grinding mill with a particulate grinding medium, the contents of the attrition grinding mill being agitated by means of an impeller, which rotates at a speed, which is insufficient to set up a vortex in the suspension, in particular, at a peripheral speed below about 10 meters/second and in which the amount of energy dissipated in the suspension during grinding is less than about 75 kWh per tonne, for example, less than about 55 kWh per tonne, of kaolin clay on a dry weight basis. The particulate grinding medium may be of relatively high specific gravity, for example, 2 or greater, and may, for example, include grains of silica sand, where the grains generally have diameters not larger than about 2 millimeters and not smaller than about 0.25 mm.

According to some embodiments, stage (b2) of the two stage form of step (b) in the method, the grinding may be performed in an attrition grinding mill, which is equipped with a stirrer capable of being rotated at a speed such that a vortex is formed in the suspension in the mill during grinding. The particulate grinding medium may have a specific gravity of 2 or more, and may include grains of silica sand, wherein the grains may generally having diameters not larger than about 2 mm and not smaller than about 0.25 mm. If stage (b2) is preceded by a relatively gentle comminution in stage (b1), the amount of energy dissipated in the suspension of kaolin clay in stage (b2) may be in the range of from about 40 kWh to about 120 kWh per dry tonne of kaolin clay. However, if the relatively gentle comminution step (b1) is omitted, the amount of energy dissipated in the suspension of kaolin clay in step (b) is preferably in the range of from about 100 kWh to about 250 kWh per dry tonne of kaolin clay.

According to some embodiments of step (c), the suspension of ground kaolin clay may be separated from the particulate grinding medium in a known manner, for example, by passing the suspension through a sieve of appropriate aperture size, for example, a sieve having nominal aperture sizes in the range of from about 0.1 mm to about 0.25 mm.

According to some embodiments of step (d), the suspension of ground kaolin clay may be classified using a centrifuge (e.g., Alfa Laval or Merco).

Following step (c), step (d) or step (e), according to some embodiments, the kaolin clay may be further treated to improve one or more of its properties. For example high energy liquid working, for example, using a high speed mixer, may be applied to the product in slurry form, for example, before step (e) or after step (e) and subsequent re-dispersion in an aqueous medium, for example, during makedown of a coating composition.

According to some embodiments, in step (e) the suspension of ground kaolin may be dewatered in one of the ways well known in the art, for example, via filtration, centrifugation, evaporation, or the like. For example, use of a filter press may be made to form a cake having a water content in the range of from about 15% to about 35% by weight. This cake may be mixed with a dispersing agent for the kaolin clay and thereby converted into a fluid slurry, which may be transported and sold in this form. Alternatively, the kaolin clay may be thermally dried, for example, by introducing the fluid slurry of the kaolin clay into a spray drier and thereby transported in a substantially dry form.

According to some embodiments, the kaolin product may have a specific surface area as measured by the BET, $N_2$ method of at least 12 square meters per gram ($m^2/g$), for example, from 15 $m^2/g$ to 20 $m^2/g$.

According to certain embodiments, less than about 80% by weight and greater than about 60% by weight of the particles of the calcium carbonate have an esd less than 2 microns. For example, less than about 70% by weight and greater than about 60% by weight of the particles of calcium carbonate have an esd less than 2 microns. The mean particle esd may be from 1 micron to 3 microns, especially from 1 micron to 1.35 microns.

The particulate calcium carbonate used in certain embodiments of the present invention may be obtained from a natural source by grinding or may be prepared synthetically by precipitation, i.e., precipitated calcium carbonate (PCC), or may be a combination of the two, i.e., a mixture of the naturally derived ground material and the synthetic precipitated material. The PCC may also be ground.

Ground calcium carbonate (GCC) is typically obtained by grinding a mineral source such as chalk, marble or limestone, which may be followed by a particle size classification step, in order to obtain a product having the desired degree of fineness. The particulate solid material may be ground autogenously, e.g., by attrition between the particles of the solid material themselves, or alternatively, in the presence of a particulate grinding medium comprising particles of a different material from the calcium carbonate to be ground.

Wet grinding of calcium carbonate involves the formation of an aqueous suspension of the calcium carbonate which may then be ground, optionally in the presence of a suitable dispersing agent, for example sodium polyacrylate. Reference may be made to, for example, EP-A-614948 for more information regarding the wet grinding of calcium carbonate. The dispersant used for grinding the calcium carbonate may comprise, consist essentially of, or consist of a non-ionic dispersant.

After the grinding has been carried out, the suspension may be dewatered to a high solids suspension, and any grinding medium removed. A high solids suspension formed by said dewatering may suitably have a solids level of at least about 10 wt % (for example, at least about 50 wt %) to about 80 wt %, for example, up to about 78 wt %. The high solids suspension may be formed using a dispersing agent, for example a non-ionic dispersant. The dispersing agent used may or may not be the same as that optionally used in the grinding step. However, the dispersing agent used at the post-grinding stage may be added to restrict flocculation of the particulate inorganic material in the high solids suspension, and may typically be present in a dispersant-effective amount, typically at least about 0.1% by weight of the dry inorganic particulate material, or at least about 5% by weight. The amount of dispersing agent which may be present may be at least about 0.3% to about 1.5% by weight of the dry inorganic particulate material. The amounts of dispersing agent specified are particularly suitable for use in connection with GCC and PCC.

When the inorganic particulate material is obtained from naturally occurring sources, it may be that some mineral impurities contaminate the ground material. For example, naturally occurring calcium carbonate occurs in association with other minerals. Also, in some circumstances, minor additions of other minerals may be included, for example, one or more of kaolin, calcined kaolin, wollastonite, bauxite, talc or mica, could also be present. In general, however, the inorganic particulate material used in certain embodiments of the invention may contain less than 5% by weight, preferably less than 1% by weight of other mineral impurities.

PCC may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of certain embodiments of the present invention. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide is substantially completely separated from the calcium carbonate if this process is to be commercially attractive. In the third main commercial process, the milk of lime is first contacted with ammonium chloride to give a calcium chloride solution and ammonia gas. The calcium chloride solution is then contacted with soda ash to produce, by double decomposition, precipitated calcium carbonate and a solution of sodium chloride.

The PCC may be formed into a cake (e.g., a filter cake), which comprises at least about 70 wt % solid content, the remainder being water. A dispersant (for example, a nonionic dispersant or an anionic dispersant) may be combined directly with the cake and, optionally, water may be added to the cake before the dispersant is added.

The process for making PCC results in very pure calcium carbonate crystals and water. The crystals can be produced in a variety of different shapes and sizes, depending on the specific reaction process that is used. The three main forms of PCC crystals are aragonite, rhombohedral, and scalenohedral, all of which are suitable for use in certain embodiments of the present invention, including mixtures thereof.

According some embodiments, the kaolin and calcium carbonates described herein may be used as a pigment product in a paper or paperboard product coating as described herein.

According to certain embodiments, the ratio of kaolin to calcium carbonate may range from about 20:80 to about 80:20, or from about 30:70 to about 70:30, or from about 40:60 to about 60:40.

According to some embodiments, a coating composition for use in producing coatings on paper or paperboard products and other substrates may include an aqueous suspension of a particulate pigment together with a hydrophilic adhesive or binder, wherein the particulate pigment may include a combination of kaolin and calcium carbonate, for example, precipitated and/or ground calcium carbonate (GCC). For example, the solids content of the paper coating composition may be greater than about 60% by weight, for example, at least about 70%, or as high as possible, but still providing a suitably fluid composition that may be used in coating. According to some embodiments, the coating composition may include a dispersing agent, for example, up to about 2% by weight of a polyelectrolyte based on the dry weight of pigment present. For example, polyacrylates and copolymers containing polyacrylate units may be used as suitable polyelectrolytes. The kaolin and calcium carbonate according to some embodiments may be used on their own in the coating composition, or they may be used in conjunction with one or more other known pigments, such as, for example, calcined kaolin, titanium dioxide, calcium sulphate, satin white, talc, and so called "plastic pigment." When a mixture of pigments is used, the kaolin and calcium carbonate pigment product according some embodiments may be present in the mixture of pigments in an amount of at least about 80% of the total dry weight of the mixed pigments.

According to some embodiments, the binder of the coating composition may include an adhesive derived from natural starch obtained from a known plant source, for example, wheat, maize, potato, or tapioca, although it is not essential to use starch as a binder ingredient. Other binders, which may be used with or without starch, are mentioned later.

According to some embodiments, the starch employed as a binder ingredient may be either unmodified or raw starch, or it may be modified by one or more chemical treatments. For example, the starch may be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric, in particular, with both cationic and anionic charges. The starch may also be converted to a starch ether or hydroxyalkylated starch by replacing some —OH groups with, for example, —O—$CH_2$—$CH_2OH$ groups, —O—$CH_2$—$CH_3$ groups or —O—$CH_2$—$CH_2$—$CH_2$—OH groups. A further class of chemically treated starches that may be used is the starch phosphates. Alternatively, the raw starch may be hydrolyzed by means of a dilute acid or an enzyme to produce a gum of the dextrin type.

According to some embodiments, the amount of the starch binder used in the coating composition may be from about 4% to about 25% by weight, based on the dry weight of pigment. The starch binder may be used in conjunction with one or more other binders, for example, synthetic binders of the latex or polyvinyl acetate or polyvinyl alcohol type. When the starch binder is used in conjunction with another binder, for example, a synthetic binder, the amount of the starch binder may be from about 2% to about 20% by weight, and the amount of the synthetic binder from about 2% to about 12% by weight, both based on the weight of dry pigment. For example, at least about 50% by weight of the binder mixture includes modified or unmodified starch.

According to some embodiments, a method of use of the coating composition may include applying the coating composition to a sheet of paper or paperboard and calendering the paper or paperboard to form a gloss coating thereon. According to some embodiments, the gloss coating is formed on one or both sides of the paper or paperboard. According to some embodiments, calendering may include passing a coated paper sheet or paperboard between calender nips or rollers one or more times to improve the paper or paperboard smoothness and gloss and reduce the bulk. According to some embodiments, elastomer coated rollers may be employed to give pressing of high solids compositions, and elevated temperature may be applied, and/or five or more passes through the nips may be performed.

According to some embodiments, paper or paperboard after coating and calendering may have a total weight per unit area in the range 30 $g/m^2$ to 70 $g/m^2$, for example, 49 $g/m^2$ to 65 $g/m^2$ or 35 $g/m^2$ to 48 $g/m^2$. The final coating may have a weight per unit area preferably from 3 $g/m^2$ to 20 $g/m^2$, for example, from 5 $g/m^2$ to 13 $g/m^2$. Such a coating may be applied to both sides of the paper. According to some embodiments, the paper gloss may be greater than 45 TAPPI units, and the Parker Print Surf value at a pressure of 1 MPa of each paper coating may be less than 1 micron.

The gloss of a coated paper or paperboard surface may be measured by means of a test laid down in TAPPI Standard No 480 ts-65. The intensity of light reflected at an angle from the surface of the paper or paperboard is measured and compared with a standard of known gloss value. The beams of incident and reflected light are both at an angle of 75 degrees to the normal to the surface. The results are expressed in TAPPI gloss units. According to some embodiments, the gloss of the pigment product may be greater than about 50, for example, greater than 55, TAPPI units.

The Parker Print Surf test provides a measure of the smoothness of a paper surface, and includes measuring the rate at which air under pressure leaks from a sample of the coated paper or paperboard which is clamped, under a known standard force, between an upper plate, which incorporates an outlet for the compressed air, and a lower plate, the upper surface of which is covered with a sheet of either a soft or a hard reference supporting material according to the nature of the paper or paperboard being tested. From the rate of escape of the air, a root mean cube gap in microns between the paper surface and the reference material is calculated. A smaller value of this gap represents a higher degree of smoothness of the surface of the paper being tested.

According to some embodiments, the adhesive or binder of the coating composition may form from 4% to 30%, for example, from 8% to 20% (e.g., from 8% to 15%) by weight of the solids content of the coating composition. The amount employed may depend on the coating composition and the type of adhesive, which may itself incorporate one or more ingredients. For example, hydrophilic adhesives incorporating one or more of the following adhesive or binder ingredients may be used in the following stated amounts: (a) latex: levels ranging from 4% by weight to 20% by weight (the latex may include, for example, a styrene butadiene, acrylic latex, vinyl acetate latex, or styrene acrylic copolymers); and (b) other binders: levels ranging from 4% by weight to 20% by weight. Examples of other binders include casein, polyvinyl alcohol, and polyvinyl acetate.

Additives in various classes may, depending on the type of coating composition and/or material to be coated, be included in the coating composition. Examples of such classes of optional additives are as follows:

(a) cross linkers, for example, in levels up to 5% by weight (e.g., glyoxals, melamine formaldehyde resins, ammonium zirconium carbonates);

(b) water retention aids, for example, in levels up to 2% by weight (e.g., sodium carboxymethyl cellulose, hydroxyethyl cellulose, PVA (polyvinyl acetate), starches, proteins, polyacrylates, gums, alginates, polyacrylamide bentonite, and other commercially available products sold for such applications);

(c) viscosity modifiers or other thickeners, for example, in levels up to 2% by weight (e.g., polyacrylates, emulsion copolymers, dicyanamide, triols, polyoxyethylene ether, urea, sulphated castor oil, polyvinyl pyrrolidone, montmorillonite, sodium alginate, xanthan gum, sodium silicate, acrylic acid copolymers, HMC (hydroxymethyl celluloses), HEC (hydroxyethyl celluloses));

(d) lubricity/calendering aids, for example, in levels up to 2% by weight (e.g., calcium stearate, ammonium stearate, zinc stearate, wax emulsions, waxes, alkyl ketene dimer, glycols);

(e) dispersants, for example, in levels up to 2% by weight (e.g., polyelectrolytes, such as polyacrylates and copolymers containing polyacrylate species, for example, polyacrylate salts (e.g., sodium and aluminum optionally with a Group II metal salt), sodium hexametaphosphates, non-ionic polyol, polyphosphoric acid, condensed sodium phosphate, non-ionic surfactants, alkanolamine, and other reagents commonly used for this function);

(f) antifoamers/defoamers, for example, in levels up to 1% by weight (e.g., blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons, and other compounds sold commercially to carry out this function);

(g) dry or wet pick improvement additives, for example, in levels up to 2% by weight (e.g., melamine resin, polyethylene emulsions, urea formaldehyde, melamine formaldehyde, polyamide, calcium stearate, styrene maleic anhydride, and others);

(h) dry or wet rub improvement and abrasion resistance additives, for example, in levels up to 2% by weight (e.g., glyoxal based resins, oxidized polyethylenes, melamine resins, urea formaldehyde, melamine formaldehyde, polyethylene wax calcium stearate, and others);

(i) gloss-ink hold-out additives, for example, in levels up to 2% by weight (e.g., oxidized polyethylenes, polyethylene emulsions, waxes, casein, guar gum, CMC, HMC, calcium stearate, ammonium stearate, sodium alginate, and others;

(j) optical brightening agents (OBA) and fluorescent whitening agents (FWA), for example, in levels up to 1% by weight (e.g., stilbene derivatives));

(k) dyes, for example, in levels up to 0.5% by weight;

(l) biocides/spoilage control agents, for example, in levels up to 1% by weight (e.g., metaborate, sodium dodecylbenene sulphonate, thiocyanate, organosulphur, sodium benzonate, and other compounds sold commercially for this function, for example, the range of biocide polymers sold by Calgon Corporation);

(m) levelling and evening aids, for example, in levels up to 2% by weight (e.g., non-ionic polyol, polyethylene emulsions, fatty acid, esters, and alcohol derivatives, alcohol/ethylene oxide, sodium CMC, HEC, alginates, calcium stearate, and other compounds sold commercially for this function);

(n) grease- and oil-resistance additives, for example, in levels up to 2% by weight (e.g., oxidized polyethylenes, latex, SMA (styrene maleic anhydride), polyamide, waxes, alginate, protein, CMC, and HMC);

(o) water-resistance additives, for example, in levels up to 2% by weight (e.g., oxidized polyethylenes, ketone resin, anionic latex, polyurethane, SMA, glyoxal, melamine resin, urea formaldehyde, melamine formaldehyde, polyamide, glyoxals, stearates, and other materials commercially available for this function); and (p) insolubilizer, for example, in levels up to 2% by weight.

For all of the above-listed additives, the percentages by weight provided are based on the dry weight of pigment present in the composition. Where the additive is present in a minimum amount, the minimum amount may be 0.01% by weight based on the dry weight of pigment.

According to some embodiments, the substrates may be coated either on a sheet forming machine (i.e., "on-machine") or "off-machine" on a coater or coating machine. Use of high solids coating compositions may be desirable because such compositions tend to leave less water to evaporate following the coating process. However, solids levels should not be high enough to create high viscosity and levelling problems.

According to some embodiments, the coating method may include (i) a means of applying the coating composition to the substrate being coated, for example, an applicator, and (ii) a means for ensuring that a desired level of coating composition is applied, for example, a metering device. When an excess of the coating composition is applied to the applicator, the metering device may be provided downstream of the applicator. Alternatively, the correct amount of coating composition may be applied to the applicator by the metering device, for example, as a film press. At the points of coating application and metering, a backing roll (e.g., one or two applicators) or nothing (i.e., web tension) may be used to support the substrate being coated. The time the coating is in contact with the substrate before the excess coating is finally removed (i.e., the dwell time) may be short, long, or variable.

According to some embodiments, the coating composition may be added by a coating head at a coating station. According to the quality of coating desired, the substrate may be single coated, double coated, and triple coated. When providing more than one coat, the initial coat (i.e., a pre-coat) may have a cheaper formulation and optionally less pigment in the coating composition. A coater that is applying a double coating (i.e., a coating on each side of the substrate), may have two or four coating heads, depending on the number of sides coated by each head. Some coating heads coat only one side at a time, but some roll coaters (e.g., film press, gate roll, size press) may coat both sides of the substrate in a single pass.

Examples of coaters that may be employed in step (b) include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters, and extrusion coaters.

According to some embodiments of the coating compositions described herein, water may be added to the solids to provide a concentration of solids, which when coated onto a sheet to a desired target coat weight, that has a rheology suitable for the composition to be coated with a pressure (e.g., a blade pressure) of between about 1 and about 1.5 bar. For example, the solids content may be from about 60% to about 70% by weight.

EXAMPLES

In order to evaluate coating compositions, typical paperboard used in the packaging industry was used as a substrate or base stock. Sample coating compositions containing selected platy clay and carbonate pigments were applied to the paperboards using a CLC (Cylindrical Lab Coater) machine. The sample coating compositions were applied on one side of the paperboard, and the samples were double-coated (i.e., a base coat and a top coat). The coated sample paperboards were then calendered, and bending modulus and stiffness tests were conducted on the coated and calendered paperboard samples. The samples were creased along machine and cross direction using a CreaseStream. Thereafter, the creased samples were folded using a rubber roller to mimic the creasing and folding in an industrial or manufacturing environment.

The failure occurring at the creased or folded path was observed under a microscope, and images were taken so that visual ratings of the flaked and cracked areas at the folds could be made. The correlation between the visual ratings for flaking and cracking tendency and the bending modulus and stiffness was evaluated.

Sample hydrous kaolin pigments having different shape factor, steepness, and particle size distribution were evaluated. Table 1 below shows the physical properties of the sample kaolin pigments used in different tests described herein. The shape factors provided for the kaolin pigment samples were determined using the technique described previously herein. The particle size distributions for the kaolin pigment samples were measured using Sedigraph technique described previously herein.

TABLE 1

| Pigments | Sedigraph PSD % <0.25 μm | Steepness | Shape Factor |
| --- | --- | --- | --- |
| Kaolin Sample 1 (KS1) | 21 | 33 | 62 |
| Comparative Kaolin Sample 1 (CKS1) | 21 | 19 | 75 |
| Comparative Kaolin Sample 2 (CKS2) | 15 | 24 | 99 |
| Comparative Kaolin Sample 3 (CKS3) | 64 | 36 | 14 |

The kaolin pigment samples were combined with calcium carbonate pigment samples (i.e., ground calcium carbonate (GCC)), and the combined pigment samples were slurried at desired solids levels as mentioned in the tables herein associated with the respective tests. For the purposes of the testing, the base coat weight was kept at 13 g/m², and the top coat weight was kept at 10 g/m². The following components were also included in the sample coating compositions tested: polyvinyl acetate-based binder (i.e., Resyn 1103 obtained from Celanese Emulsions); acrylic binder (i.e., Rhoplex P-308 obtained from Rohm and Haas); carboxymethyl cellulose (CMC) thickener (i.e., FINNFIX 30 obtained from METSA Specialty Chemicals); carboxymethyl cellulose (CMC) thickener (i.e., FINNFIX 10 obtained from Noviant); hydrophobically-modified alkali swellable emulsion (HASE) thickener (i.e., Rhoplex RM232D obtained from Rohm and Haas); acrylic-based emulsion copolymer thickener (i.e., Alcogum L29 obtained from Alco Chemical); and coating lubricant (i.e., Berchem 4095 obtained from Bercen, Inc.).

EXPERIMENTAL METHODS

In order to assess the flaking and cracking characteristics of the samples, paperboard samples were coated and tested. The coated paperboards were calendered at 175 pounds per square inch (psi) pressure, 150 degrees F. using a Beloit Model 750 Calender. The coating samples were kept in a TAPPI conditioned room for at least twenty-four hours and thereafter creased using a CreaseStream machine. The samples were creased along the machine and cross directions, and were thereafter folded in the direction away from coated side first and then towards coated side to obtain visually notable difference in the fractures occurring at the folded area. The folds were made using a 500 gram rubber roller. The samples were thereafter flattened out, and images of the cracking-flaking tendency were taken using a microscope.

A team of eight to ten people were trained to assess the cracking and flaking results using a visual ranking method, with a rating of 1 being the best, a rating of 5 being average, and a rating of 10 being the worst. The team was provided with reference images associated with each of the rating values to compare the tested samples with these reference images to obtain more accurate results through the visual ranking method. The average cracking and flaking ratings were reported for each sample tested.

The following factors were considered for visual assessment of cracking and flaking tendency, for cracking: (1) the overall size of the cracks; (2) the length of cracks; and (3) the number of cracks; and for flaking: (1) the chunks of coating layers missing; (2) the coating particles loosely held at the folded area; and (3) the coating layer about to flake across the folded region.

In order to assess the strength of the sample paperboards coated with the tested coating samples, the samples were tested according to a simply supported beam theory, with each sample supported at opposite ends with a concentrated load applied at the midpoint between the supports. See FIG. 1, which shows a schematic of the testing arrangement, where P is the load applied at the center of the sample, L is the length of the sample, E is the elastic modulus, I is the moment of inertia, and $\partial$ is the amount of deflection.

The bending resistance measurements were carried out on coated paperboards per the ASTM D790-B method. A Thwing Albert EJA series instrument with a 10N load cell and MAP-Motion Analysis Presentation software was used to collect the raw data. The strength of the tested material could be understood with the help of bending test results. Raw data of amount of load applied to the sample and the associated deflection was recorded using the Thwing Albert instrument. Load and displacement readings within the initial segment of the load-displacement graph were considered for the stiffness calculations to better differentiate the samples. The force was applied to each sample in the x-y plane. Within the elastic range it can be observed that the load and displacement relationship is linear. This initial region is may be instructive as the crack initiation may begin in this region.

During testing, each sample was placed spanning two supporting aluminum anvils. It is noted that sample paperboards were coated on the CLC, calendered, and conditioned before conducting the bending tests. The force is applied at the center of each test sample, and the resistance of each sample to the applied bending force was recorded. Each of the samples was kept in a TAPPI conditioned room for at least twenty-four hours before conducting bending tests. Each sample had the dimensions of 1 inch×3 inches.

Effort was made to investigate whether better disruption of the pigment packing structure may reduce the modulus or stiffness of the samples. The effect of varying GCC coarseness in the coating layer on mechanical properties and its impact on flaking and cracking tendency was studied. Table 2 below shows the coating formulations included in this test. The coating drawdowns were taken on Mylar film using a Precision coater. RL003 Polish MT/DF Mylar drafting film manufactured by Grafix was used as a base substrate in this experiment.

TABLE 2

| | Components | #1A | #2A | #1 | #2 | #3 |
|---|---|---|---|---|---|---|
| Pigments | Comparative Ground Calcium Carbonate 1 (CGCC1) | 50 | 50 | | | |
| | CKS2 | | 50 | 50 | 50 | 50 |
| | CKS1 | 50 | | | | |
| | Comparative Ground Calcium Carbonate 2 (CGCC2) | | | 50 | | |
| | Comparative Ground Calcium Carbonate 1 (GCC1) | | | | 50 | |
| | Comparative Ground Calcium Carbonate 3 (CGCC3) | | | | | 50 |
| Binder | PVAc 1103 | 20 | 20 | 20 | 20 | 20 |
| Thickener | RM 232 | 0.45 | 0.45 | 0.45 | 0.45 | 0.45 |
| | Ec | 2.0 | 1.8 | 1.9 | 1.3 | 2.4 |
| | | CGCC1/ CKS1 | CGCC1/ CKS2 | CGCC2/ CKS2 | GCC1/ CKS2 | CGCC3/ CKS2 |

Figure 2:
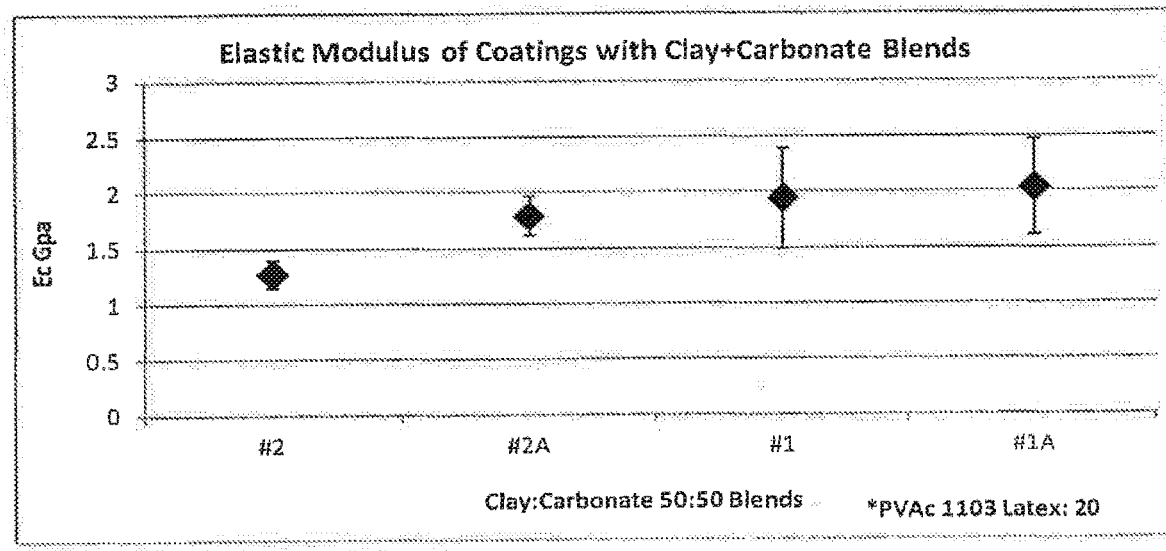
FIG. 2 is a graph showing elastic modulus of coating samples.

FIG. 2 shows that exemplary embodiments of high shape factor platy clays like CKS2 and CKS1 showed a lower modulus with GCC1 compared to CGCC1 when blended in a 50:50, clay:carbonate ratio. These results were based on the lab scale drawdown study, but the overall graph shows a significant difference in the modulus results between samples. Based on these results, further testing was conducted using the CLC machine to mimic the commercial coating application process and validate the effects of GCC coarseness on bending resistance and folding ability of the paperboards.

The effect of increasing the level of thickener in the coating compositions on flaking and cracking tendency was tested to determine whether the hold out of top coat can be improved so that the more open base coat is not reinforced by the top coat penetration. Details of the tested coating compositions are provided in Table 3 below.

TABLE 3

| | Components | BC1 | TC1 | TC2 | TC3 | TC4 |
|---|---|---|---|---|---|---|
| Pigments | Comparative Ground Calcium Carbonate 4 (CGCC4) | | 30 | 30 | 30 | 30 |
| | CKS3 | | 70 | 70 | 70 | 70 |
| | CGCC1 | 50 | | | | |
| | CKS2 | 50 | | | | |
| Binder | PVAc 1103 | 15 | 20 | 20 | 20 | 20 |
| Lubricant | Berchem 4095 | | 0.7 | 0.7 | 0 7 | 0.7 |
| Thickeners | RM-232 | 0.367 | 0 | 0.07 | 0.15 | 0.25 |
| | Finnfix 10 | | | | | |
| | Finnfix 30 | | | | | |

Comparing the results, it was observed that flaking and cracking tendency in the cross direction was more severe than in the machine direction. It was also found that increasing the RM232 thickener level reduces the severity of cracking and flaking in the machine direction. Comparing the two CMC types, the one with the higher molecular weight (Finnfix 30) provided slightly improved flaking and cracking results.

The effects of coating compositions were tested for a number of samples to determine the factors affecting the modulus and stiffness of the coating compositions. The mechanical strength properties of the paperboards coated with a base coat only and paperboards coated with a top coat and a base coat were studied to determine the response of the single and double coating layers on the flaking and cracking tendency. Table 4 below shows the different pigment blends used in this testing and other composition details.

TABLE 4

| | Components | BC1 | BC2 | BC3 | BC4 | BC5 |
|---|---|---|---|---|---|---|
| Pigments | CGCC4 | | | | | |
| | GCC1 | | | 50 | 50 | 50 |
| | CGCC1 | 50 | 50 | | | |
| | CKS3 | | | | | |
| | CKS1 | 50 | | 50 | | |
| | CKS2 | | 50 | | 50 | |
| | KS1 | | | | | 50 |
| Binders | PVAc 1103 | 15 | 15 | 15 | 15 | 15 |
| Lubricant | Berchem 4095 | | | | | |
| Thickener | RM-232 | 0.45 | 0.45 | 0.45 | 0.45 | 0.45 |

TABLE 4-continued

| | Components | BC6 | TC1 | TC2 | TC3 | TC4 |
|---|---|---|---|---|---|---|
| Pigments | CGCC4 | | 30 | 100 | 100 | 80 |
| | GCC1 | 50 | | | | |
| | CGCC1 | | | | | |
| | CKS3 | | 70 | | | 20 |
| | CKS1 | | | | | |
| | CKS2 | | | | | |
| | KS1 | 50 | | | | |
| Binders | PVAc 1103 | 12 | 20 | 20 | 15 | 15 |
| Lubricant | Berchem 4095 | | 0.7 | 0.7 | 0.7 | 0.7 |
| Thickener | RM-232 | 0.45 | 0.1 | 0.1 | 0.25 | 0.25 |

Figure 3:
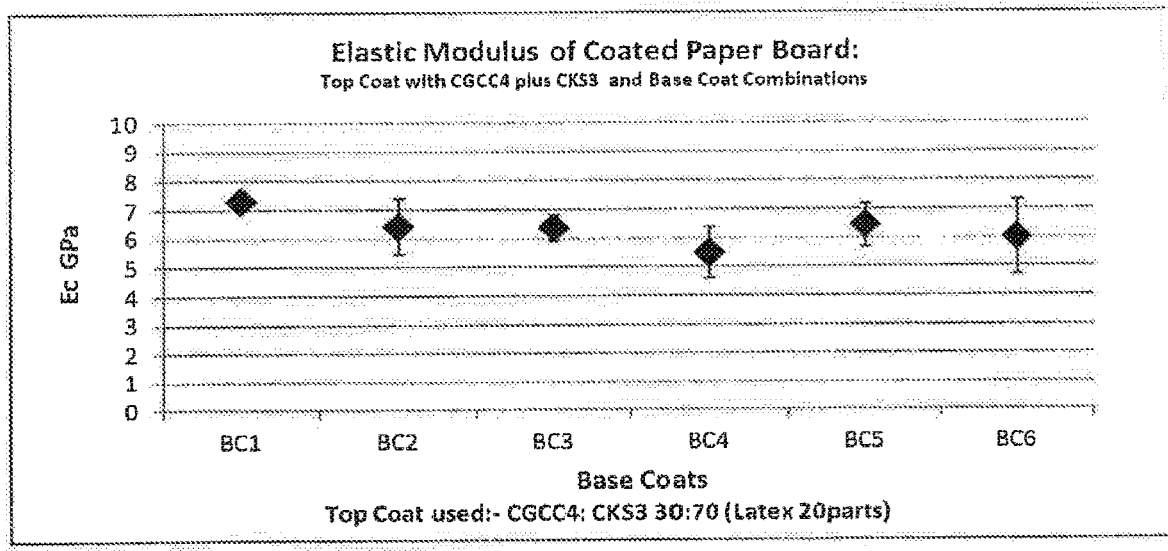
FIG. 3 is a graph showing elastic modulus of coated paperboard samples.
Figure 4:
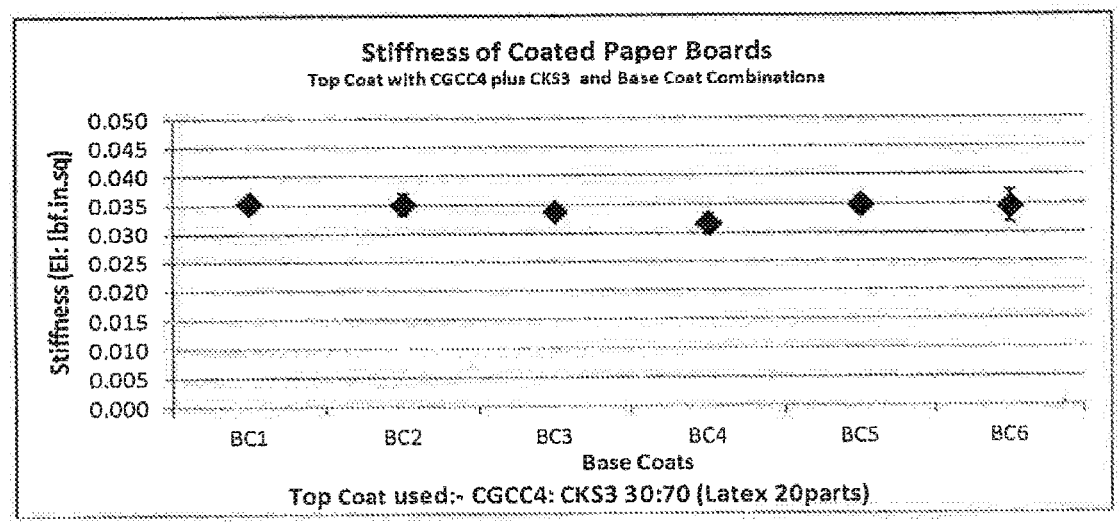
FIG. 4 is a graph showing bending stiffness of coated paperboard samples.
Figure 5:
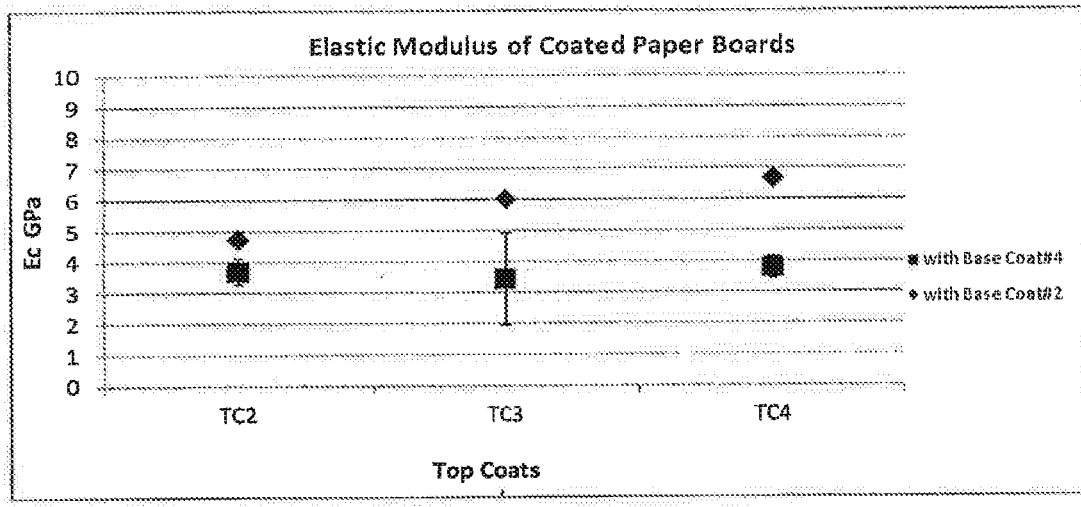
FIG. 5 is a graph showing elastic modulus of coated paperboard samples.
Figure 6:
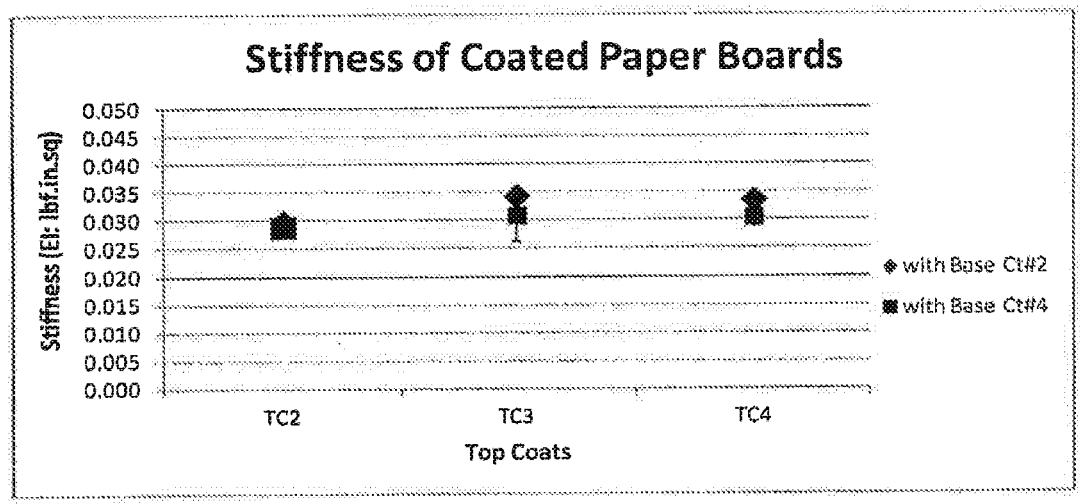
FIG. 6 is a graph showing bending stiffness of coated paperboard samples.

As shown in FIG. 3, there is slight reduction in the modulus in case of base coat compositions including GCC1 relative to base coat compositions including Carbital 60. As shown in FIG. 4, the bending stiffness (IE) of the coatings containing GCC1 are slightly lower than the bending stiffness of coatings containing CGCC1. Base coat compositions including GCC1 and KS1 at a lower latex level provided lower stiffness results. FIG. 5 shows*that the paperboards coated with the coating composition including Carbital 70:CKS1 as a base coat provided slightly lower bending modulus values than the coating composition base coats including Carbital 60:CKS1. As shown in FIG. 6, the stiffness of paperboards coated with the coating composition base coat including GCC1:CKS1 provided slightly lower values compared to the coating composition base coat including CGCC1:CKS1.

Figure 7:
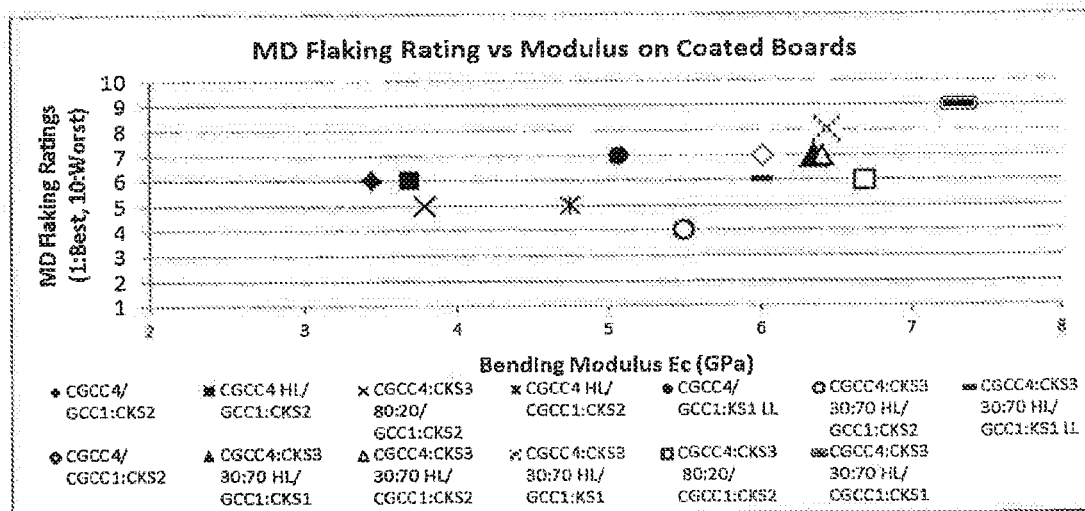
FIG. 7 is a graph showing flaking ratings of coated paperboard samples.
Figure 8:
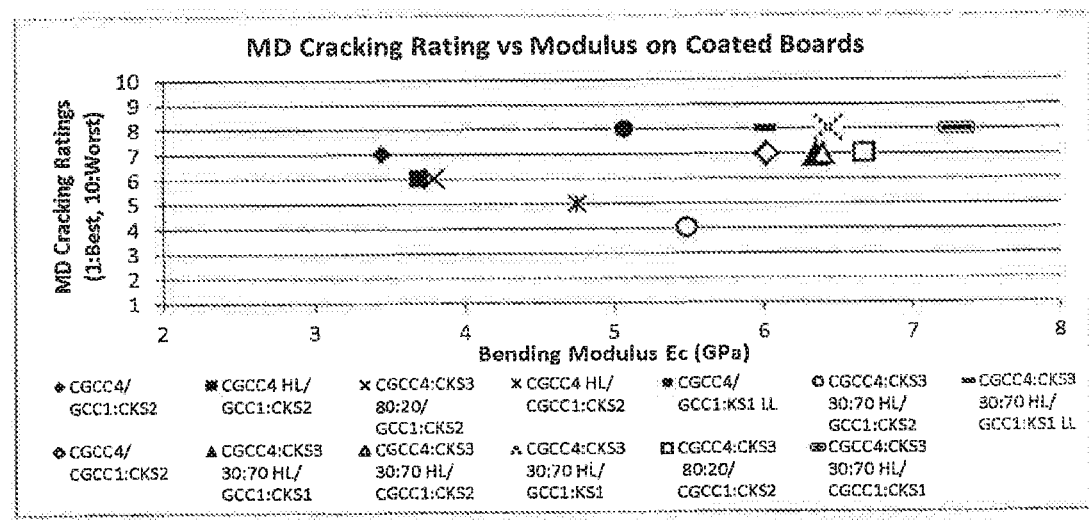
FIG. 8 is a graph showing cracking ratings of coated paperboard samples.

The coating compositions identified in the horizontal legends of FIGS. 7 and 8 are listed in order of lowest bending modulus on the left-hand top corner (CGCC4 top coat/GCC1/CKS2 base coat) to the highest modulus on the right-hand bottom corner (CGCC4:Kao91 30:70 top coat High Latex/CGCC1:CKS1 base coat). The flaking and cracking tendency of the coated paperboards is shown with respect to the bending modulus results. Although the data points in FIGS. 7 and 8 are scattered, there is a clear distinction between base coat compositions containing GCC1 and CGCC1. Overall, the base coat compositions containing GCC1 tend to reduce the severity of flaking and cracking. A higher latex content in the top coat compositions appears to improve the flaking and cracking performance. However, the base coat compositions have a stronger influence on flaking and cracking compared to the top coat compositions.

In addition, different base coat compositions were tested to evaluate whether the binder could be reduced while still reducing flaking. The selection of base coat pigments was based on the testing results mentioned previously herein. Paperboards were coated on the CLC, standard paper tests were conducted, and flaking and cracking tendency ratings were made.

The following pigment samples were tested with respect to the folding ability of the coated paperboards: (1) KS1; (2) CKS2; (3) CKS1; (4) CGCC1; and (5) GCC1. The following variables were tested with respect to the folding ability of the coated paperboards: thickener variation, KOH dispersion, coat weight variation, binder level (PVAc at 22, 19, and 16 parts), PVAc+Acrylic (at 11 and 11 parts), and binder type (PVAc and PVAc+Acrylic). The results shown in Table 5 below were normalized with constant coat weight and actual thickener levels using general regression.

TABLE 5

| Components | | BC1 | BC2 | BC3 | BC4 | BC5 | BC7 | BC9 |
|---|---|---|---|---|---|---|---|---|
| Pigments | CKS2 | 50 | | 50 | | 50 | | |
| | CKS1 | | 50 | | 50 | | | |
| | KS1 | | | | | | 50 | 50 |
| | CGCC1 | 50 | 50 | 50 | 50 | | 50 | |
| | GCC1 | | | | | 50 | | 50 |
| Binders | PVAc 1103 | 11 | 11 | 22 | 22 | 11 | 11 | 11 |
| | BASF P308 | 11 | 11 | | | 11 | 11 | 11 |
| Thickener | Alcogum L29 | 0.45 | 0.53 | 0.40 | 0.452 | 0.49 | 0.58 | 0.64 |

| Components | | BC17 | TC |
|---|---|---|---|
| Pigments | CKS2 | 50 | |
| | GCC1 | 50 | |

TABLE 5-continued

| | | | |
|---|---|---|---|
| | CGCC4 | | 70 |
| | CKS3 | | 30 |
| Binders | PVAc 1103 | 16 | 11 |
| | BASF P308 | | 11 |
| Lubricant | Berchem 4095 | | 0.7 |
| Thickener | Alcogum L29 | 0.34 | 0.12 |

Figure 9:
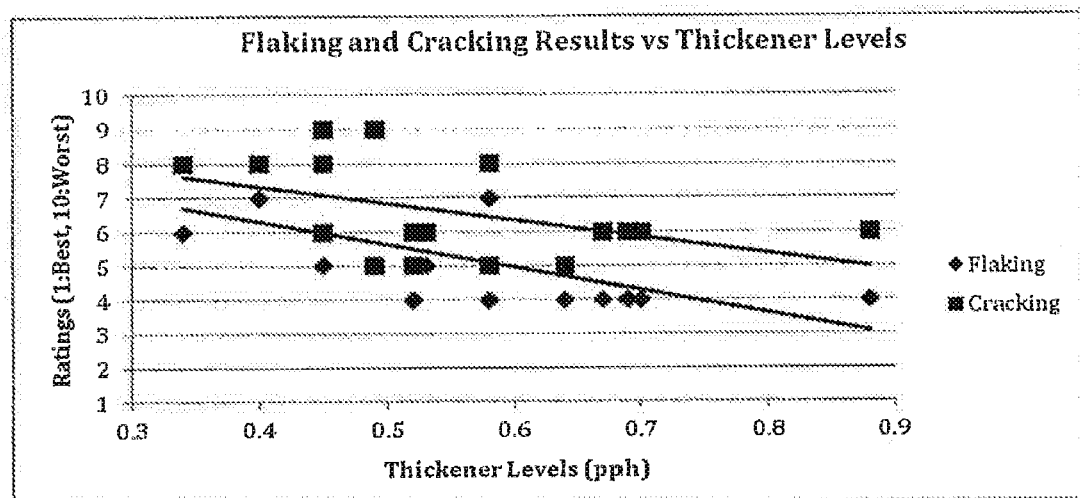
FIG. 9 is a graph showing flaking and cracking ratings vs. thickener levels.
Figure 10:
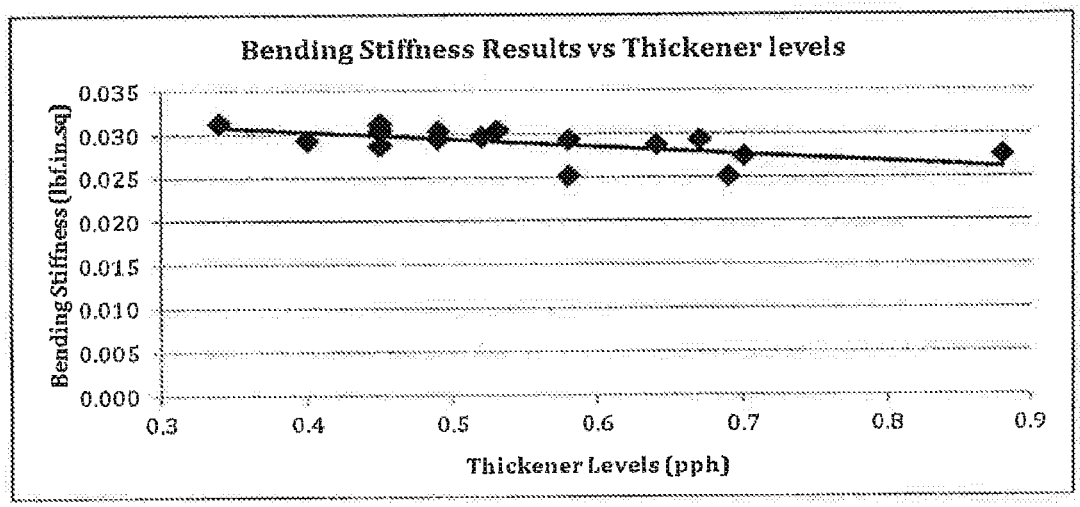
FIG. 10 is a graph showing bending stiffness vs. thickener levels.

FIG. 9 shows that lower flaking and cracking tendency could be achieved at increased thickener levels in the base coat compositions. Similar results were observed for the experiment carried out earlier, where thickener levels were increased in the top coat compositions. As shown in FIG. 10, a slight reduction in the bending stiffness values with an increase in the thickener level explains the reduced flaking and cracking tendency observed at higher thickener levels.

Figure 11:
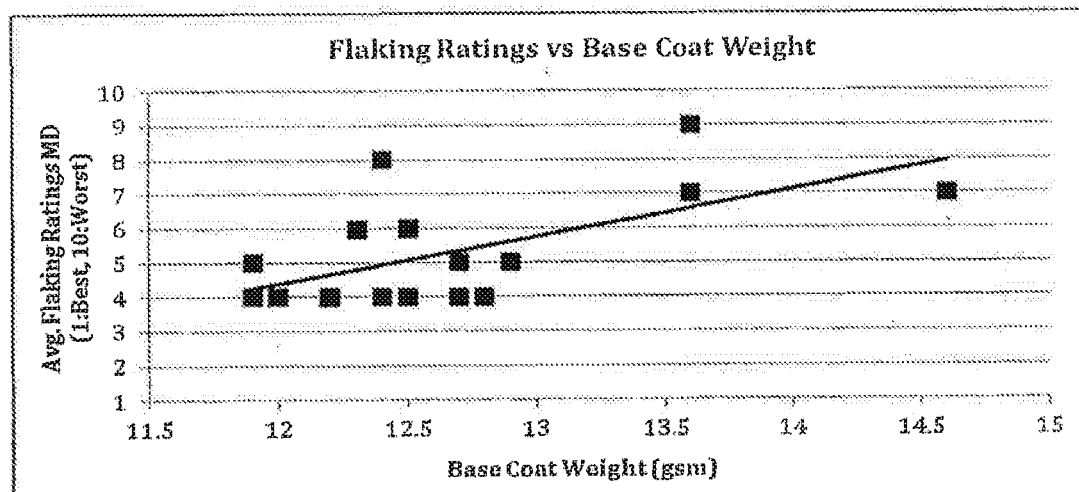
FIG. 11 is a graph showing flaking ratings vs. base coat weight.
Figure 12:
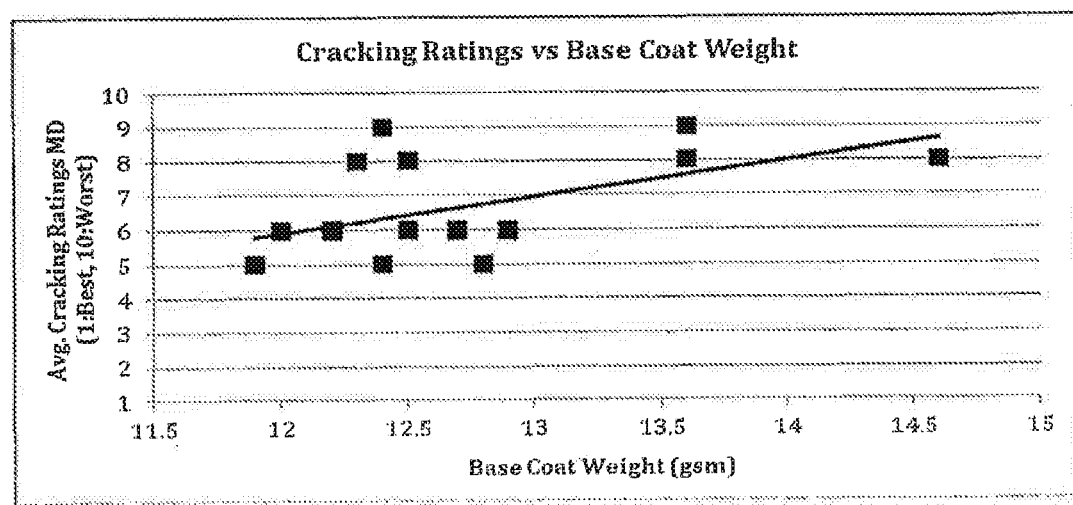
FIG. 12 is a graph showing cracking ratings vs. base coat weight.

Referring to FIGS. 11 and 12, although a few data points are scattered, the trend lines indicate that flaking and cracking ratings increase with an increase in base coat weight. Thus, levels of base coat weight may be adjusted to achieve desirable impact on the flaking and cracking tendency.

Figure 13:
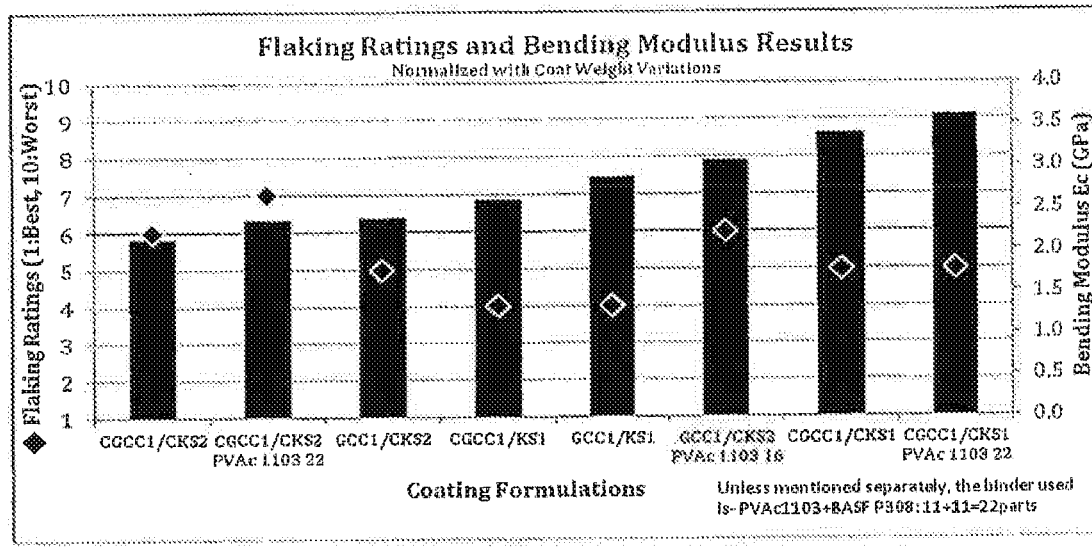
FIG. 13 is a graph showing flaking ratings and bending modulus results for coating composition samples.

As shown in FIG. 13, pigment blends GCC1/KS1 and CGCC1/KS1 with PVAc1103:Acrylic P308 binder show lower bending modulus and flaking tendency as compared to the control CGCC1/CKS1 composition with PVAc1103:Acrylic P308 binder. Also, flaking results of the GCC1/CKS2 compositions are superior to the control CGCC1/CKS2.

Figure 14:
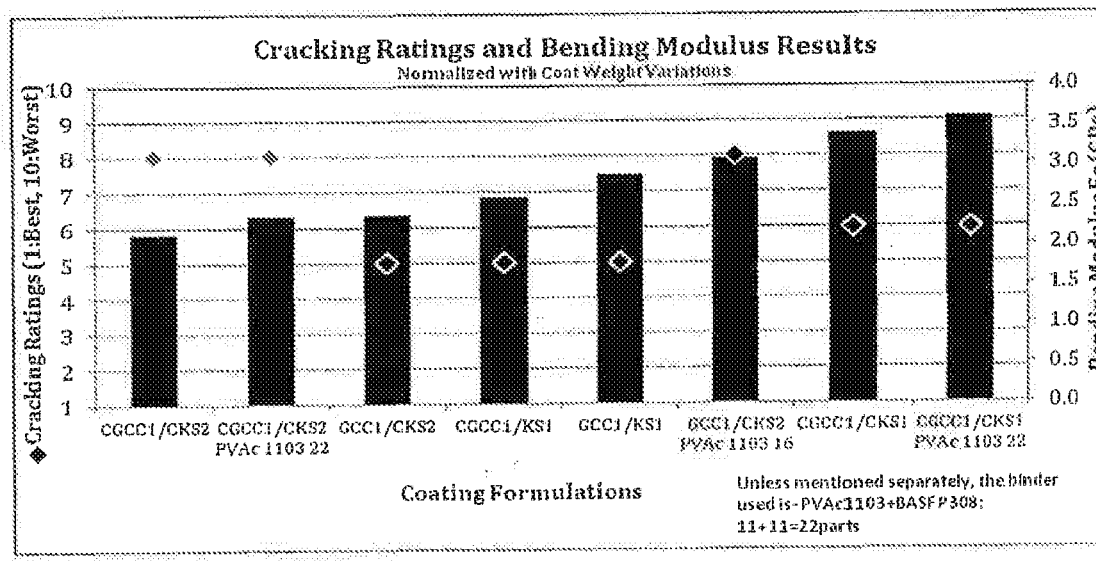
FIG. 14 is a graph showing cracking ratings and bending modulus results for coating composition samples.

As shown in FIG. 14, formulations GCC1/KS1 and CGCC1/KS1 with PVAc1103:Acrylic P308 11+11 parts of binder showed lower bending modulus values and improved cracking tendency as compared to the control CGCC1/CKS1. It can be observed from FIG. 14 that the correlation between bending modulus and cracking performance is weak.

Figure 15:
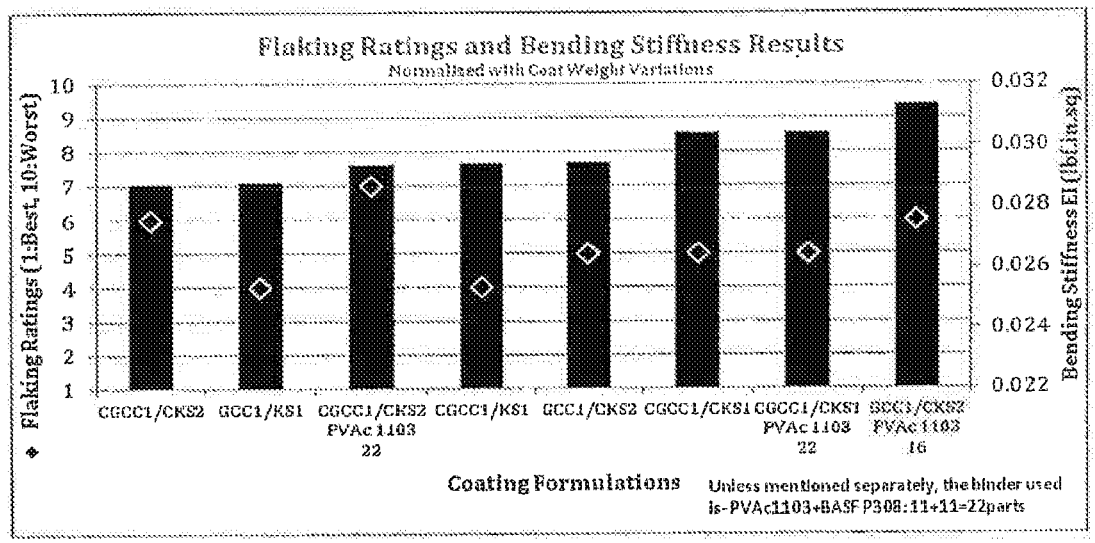
FIG. 15 is a graph showing flaking ratings and bending stiffness results for coating composition samples.

As shown in FIG. 15, the bending stiffness results for GCC1/KS1 and CGCC1/KS1 with PVAc1103:Acrylic P308 11+11 parts of binder are lower than the control and have better flaking tendency than the control composition CGCC1/CKS1.

Figure 16:
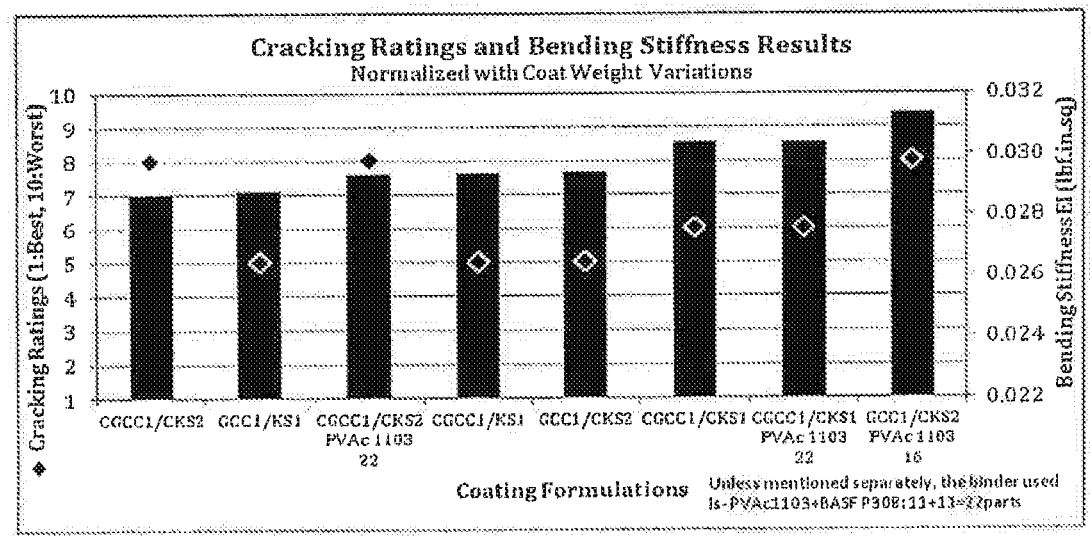
FIG. 16 is a graph showing cracking ratings and bending stiffness results for coating composition samples.

FIG. 16 shows that the correlation between cracking tendency and bending stiffness is weak. However, coating compositions GCC1/KS1 and CGCC1/KS1 with PVAc1103:Acrylic P308 11+11 parts of binder showed consistent improvements in the cracking tendency at lower stiffness.

Table 6 below shows average flaking and cracking results, bending modulus, and stiffness measurements of the sample coating compositions.

TABLE 6

| Binder System | Pigment Blends | Avg. Flaking MD | Avg. Cracking MD | Bending Modulus (GPa) Normalized with Coat Weight | Bending Stiffness (lbf · in · sq) Normalized with Coat Weight |
|---|---|---|---|---|---|
| PVAc 1103 + P308 Binder (11 + 11 parts) | CGCC1/4350 | 4 | 6 | 2.4 | 0.029 |
| | GCC1/KS1 | 4 | 5 | 2.9 | 0.029 |
| | CGCC1/KS1 | 4 | 5 | 2.6 | 0.029 |
| | GCC1/CKS2 | 5 | 5 | 2.4 | 0.029 |
| | CGCC1/CKS2 | 6 | 8 | 2.1 | 0.029 |
| | CGCC1/CKS1 | 5 | 6 | 3.4 | 0.030 |
| PVAc 1103 Binder (22 parts) | CGCC1/CK52 | 7 | 8 | 2.4 | 0.026 |
| | CGCC1/CKS1 | 5 | 6 | 3.6 | 0.030 |
| PVAc 1103 Binder (16 parts) | GCC1/CKS2 | 6 | 8 | 3.1 | 0.031 |

Table 7 below shows the sample coating compositions that improved flaking and cracking performance of the paperboards compared to the respective control compositions.

TABLE 7

| Control Forms | Possible Solutions | Flaking Tendency | Cracking Tendency |
|---|---|---|---|
| Compare with Control CGCC1/CKS1 | Control CGCC1/CKS1 | 5 | 6 |
| | GCC1/KS1 | 4 | 5 |
| | CGCC1/KS1 | 4 | 5 |
| Compare with Control CGCC1/CKS2 | Control CGCC1/CKS2 | 6 | 8 |
| | GCC1/CKS2 | 5 | 5 |

Based on the testing, the sample coating compositions including CGCC1/KS1 and GCC1/KS1 provided lower flaking and cracking tendency than the control composition including CGCC1/CKS1. The bending modulus and stiffness results of these samples were significantly lower than ones coated with the control composition CGCC1/CKS1. Flaking and cracking tendency results of the sample compositions including GCC1/CKS2 were better than the control composition CGCC1/CKS2. Changing only the carbonates in the control coating composition CGCC1/CKS2 showed significant improvements in the flaking and cracking tendency.

As shown by the test results, GCC coarseness seems to have an effect on the modulus and stiffness of the coatings. The packing structure within the coating layer and alignment of high shape factor platy clays may have a strong influence on the in-plane strength properties of the coating layer. GCC1 in combination with clays in the base coats improved flaking and cracking results compared to the base coat compositions containing CGCC1. The composition containing KS1 in the base coats at a lower latex level provided improved results at some instances compared to the base coats including CKS1. A slightly higher amount of latex could be used to improve the cracking and flaking tendency. The composition including KS1 pigment in the base coat compositions may improve the folding ability at normal or slightly reduced binder levels. The testing also shows that coating compositions having slightly higher than normal thickener levels provide improved overall folding ability of the paper grades.

According to some embodiments, a coating composition may include kaolin having a shape factor of less than about 70, and calcium carbonate having a mean particle size ($d_{50}$) of at least about 2.4 microns and a steepness factor of at least about 30. For example, the $d_{50}$ may be greater than about 2.6 microns, greater than about 2.8 microns, or greater than about 3.0 microns. According to some embodiments, the steepness factor (e.g., $d_{30}/d_{70} \times 100$) may be greater than about 32, greater than about 34, greater than about 36, greater than about 40, or greater than about 43. Some embodiments of the coating may contain ground calcium carbonate having the exemplary particle size distribution shown below in Table 8. The composition in Table 8 will be referred to as "GCC2."

TABLE 8

| Sedigraph 5100 | GCC2 Composition |
|---|---|
| <10 μm (%) | 98 wt. % |
| <5 μm (%) | 81 wt. % |
| <2 μm (%) | 40 wt. % |
| <1 μm (%) | 13 wt. % |
| <0.5 μm (%) | 2 wt. % |
| <0.25 μm (%) | 1 wt. % |
| $d_{30}$ | 1.7 μm |
| $d_{50}$ | 2.6 μm |
| $d_{70}$ | 4.0 μm |
| Steepness Factor | 43 |
| BET Surface Area | 3 m²/g |

It can be seen from Table 8 that the median particle size ($d_{50}$) of GCC2 is relatively large, about 2.6 microns. The overall particle size distribution of GCC2 also has a relatively high steepness factor of at least about 30, specifically about 43. GCC2 was classified to remove the coarsest particles, resulting in a greater percentage of particles having an esd less than about 10 microns, while still maintaining a generally coarse particle size distribution. The overall coarse particle size distribution is also indicated by the relatively low percentage of fine particles (e.g., particles with an esd less than 1 micron).

The coarser, narrow GCC particle size distribution in GCC2 may have a significant effect on the bending stiffness and folding ability of double coated paper and paperboards when used in a coating, such as a base coat. As shown in Tables 9 and 10, several coating formulations were prepared by blending different platy clays with GCC2 at 50:50 (Table 9) and 25:75 (Table 10) clay-to-carbonate ratios. The blended clay-carbonate base coats were evaluated on smoothness and folding performance when placed on a substrate. Pure coatings with 100 percent of CGCC1, GCC2, and CKS2 were also evaluated to understand the coating structure, bending stiffness, and its effects on the folding ability.

As described above, the binder and thickener levels may impact the folding ability of the coated substrates. Thus, when evaluating the clay-GCC2 compositions, the binder and thickener levels of the base coats were kept constant. The top coat formulation was also kept constant. To evaluate the clay-GCC2 compositions, SBS base boards were double-coated on a CLC machine. All coatings were prepared at optimum solids and at about 8.5 pH. For the purposes of testing, the base coat weight was kept constant at 13 g/m² and the top coat was kept constant at 10 g/m². All the samples were calendered before testing.

TABLE 9

| Pigments | | Base Coat Formulations | | | | | | | |
|---|---|---|---|---|---|---|---|---|---|
| Pigments | KS1 | | 50 | | | | | | 25 |
| | CKS1 | 50 | | | | | | 25 | |
| | KS3 | | | 50 | | | | | |
| | KS2 | | | | 50 | | | | |
| | CKS2 | | | | | 50 | | | |
| | CGCC1 | | | | | | | | |
| | GCC2 | 50 | 50 | 50 | 50 | 50 | 50 | 75 | 75 |
| | CGCC4 | | | | | | | | |
| | CKS3 | | | | | | | | |
| | KS4 | | | | | | 50 | | |
| Binders | PVAc 1103 | 11 | 11 | 11 | 11 | 11 | 11 | 11 | 11 |
| | BASF P308 | 11 | 11 | 11 | 11 | 11 | 11 | 11 | 11 |
| Lubricant | Berchem 4095 | | | | | | | | |
| Thickener | L29 | 0.45 | 0.45 | 0.45 | 0.45 | 0.45 | 0.45 | 0.45 | 0.45 |

TABLE 10

| Pigments | | Base Coat Formulations | Top Coat |
|---|---|---|---|
| Pigments | KS1 | | |
| | CKS1 | | |
| | KS3 | 25 | |

TABLE 10-continued

| Category | Pigments | \\ | Base Coat Formulations | \\ | \\ | \\ | \\ | \\ | Top Coat |
|---|---|---|---|---|---|---|---|---|---|
| Pigments | KS2 | 25 | | | | | | | |
| | CKS2 | | 25 | | | 100 | | | |
| | CGCC1 | | | | | | | 100 | |
| | GCC2 | 75 | 75 | 75 | 75 | | 100 | | |
| | CGCC4 | | | | | | | | 70 |
| | CKS3 | | | | | | | | 30 |
| | KS4 | | | 25 | | | | | |
| Binders | PVAc 1103 | 11 | 11 | 11 | 11 | | | | 11 |
| | BASF P308 | 11 | 11 | 11 | 11 | | | | 11 |
| Lubricant | Berchem 4095 | | | | | | | | 0.7 |
| Thickener | L29 | 0.45 | 0.45 | 0.45 | 0.45 | | | | 0.12 |

Figure 17:
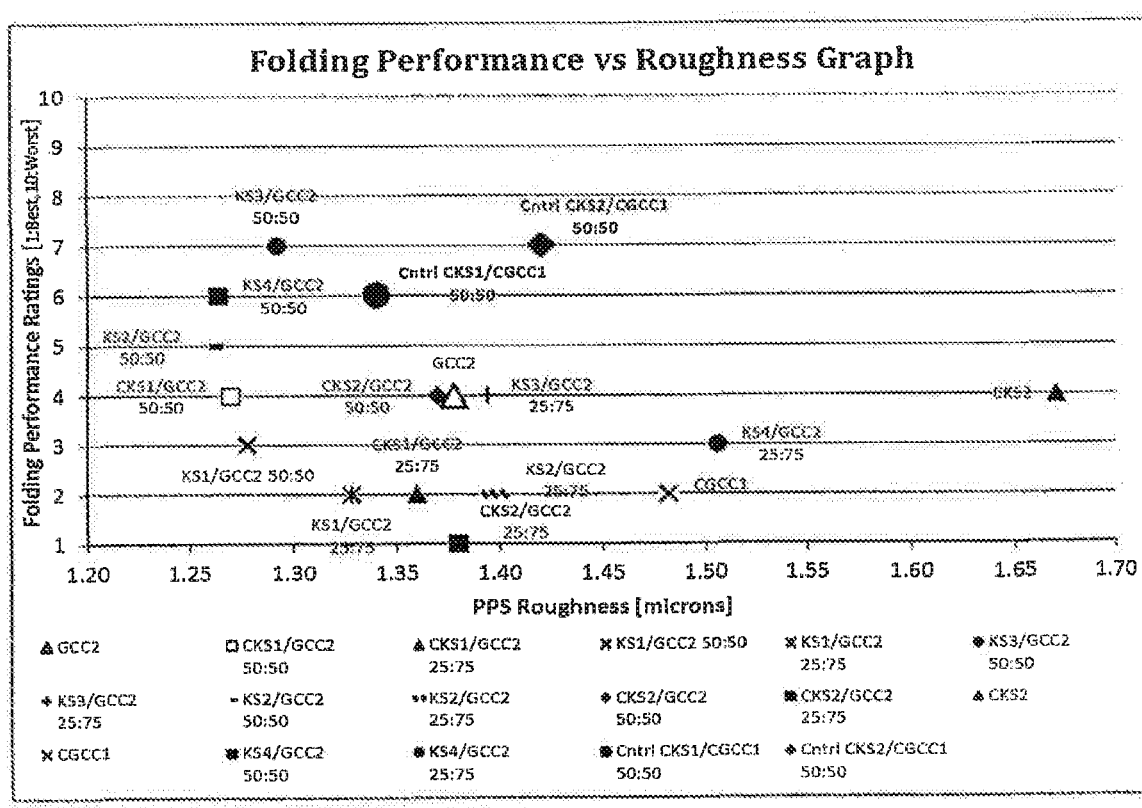
FIG. 17 is a graph showing folding performance vs. roughness results for coating composition samples.

FIG. 17 shows the folding performance ratings for each of the clay-GCC2 compositions, as compared with CGCC1, CKS2, and two control compositions. As shown in FIG. 17, compositions containing GCC2 pigments in the base coats showed improved folding performance of the samples compared to the other blends tested in the series of experiments without GCC2, described above. Except for the KS4/GCC2 and KS3/GCC2 compositions at 50:50 ratio, all other blends showed improved folding ability over the control coatings (e.g., Cntrl CKS2/CGCC1 and Cntrl CKS1/CGCC1). The Improved folding ratings obtained for the coating formulations were within the range of 1 to 5, and generally within the range of 1 to 4.

As shown in FIG. 17, the base coat blends with KS1/GCC2 at 50:50 and 25:75 ratios and CKS1/GCC2 at 25:75 ratio showed improved folding performance and smoothness compared to 100% GCC2 and control formulations. Also, some blends, such as CKS1/GCC2 at 50:50 ratio, showed a substantial improvement in smoothness, while other blends, such as CKS2/GCC2 at 50:50 ratio, showed a slight improvement in smoothness while maintaining comparable folding performance when compared to the 100% GCC2 blend. Although CKS2/GCC2 at 25:75 ratio blend does not appear to show any significant improvement in the smoothness as compared to the 100% GCC2 blend, this blend showed the best folding performance results compared to the rest of the group.

Figure 18:
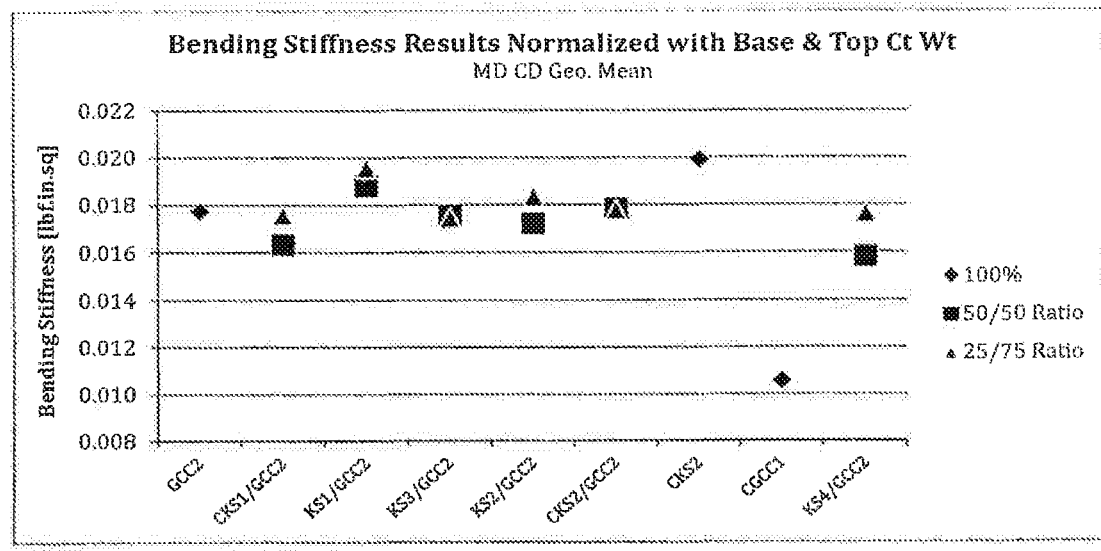
FIG. 18 is a graph showing bending stiffness results for coating composition samples.

FIG. 18 shows the bending stiffness results for the coatings described in Tables 9 and 10, where 100% CGCC1 was used in the base coat formulation. The bending stiffness results in FIG. 18 suggest that samples coated with KS1/GCC2 blends (e.g., 50:50 and 25:75 ratios) have a higher bending stiffness when compared to other clay-carbonate blends included in the experiment. Without being limited by theory, it is possible that the bulky structure of coating blends containing KS1 pigments may contribute to the slightly higher bending stiffness of these blends. Comparing stiffness results of FIG. 18 and results described above (e.g., FIGS. 4 and 8), the overall range of stiffness values of the platy clay-GCC2 forms appear to be slightly lower than the platy clay-CGCC1 blends.

Figure 19:
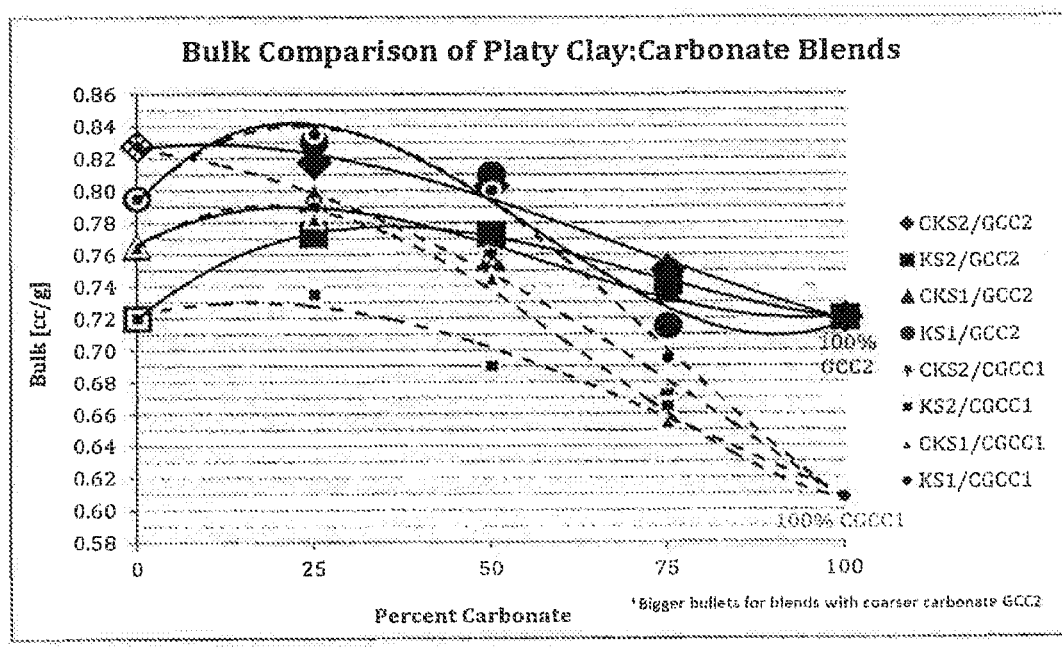
FIG. 19 is a graph showing bulk vs. composition for coating composition samples.

FIG. 19 shows a comparison of the bulk for platy clay-carbonate blends described above for both CGCC1 and GCC2. FIG. 19 shows that KS1/Carbonate blends tend to impart a bulkier structure at 50:50 & 75:25 ratios compared to other clay-carbonate blends. From FIG. 19, it also appears that 100% GCC2, having coarser carbonate pigments, imparts a bulkier structure than 100% CGCC1. Standard GCC, such as CGCC1 containing higher percentage of fine particles, for example, less than 2 microns, may provide denser packing than a narrower particle size distribution with coarser pigments, such as GCC2. Similarly, the bulky nature of blends containing KS1 may be useful in hiding base paper irregularities and achieving improved smoothness and light scatter.

FIGS. 17-19 suggest that the KS1/GCC2 blend combination may provide an optimum packing structure that is required for improved folding ability and mechanical strength properties. For example, the formulations with KS1 in the base coats showed improved folding performance results consistently in each of the experimental results disclosed herein. From the results described in FIGS. 17-19, it appears that KS1 in combination with GCC2 provides improved smoothness and folding performance without affecting the bending stiffness of the coated samples.

Generally, it appears that the KS2, CKS2, CKS1, and KS1 platy clay pigments blended with GCC2 showed improved smoothness and folding performance relative to the same platy clay pigments blended with CGCC1. Changing the base coat formulations from 100% CGCC1 to 100% GCC2 also appears to improve the smoothness of the coating, but the folding performance may be compromised to some extent. It is also important to note that compared to the control formulations, the 100% GCC2 coating showed enhanced folding performance and comparable smoothness.

Figure 20:
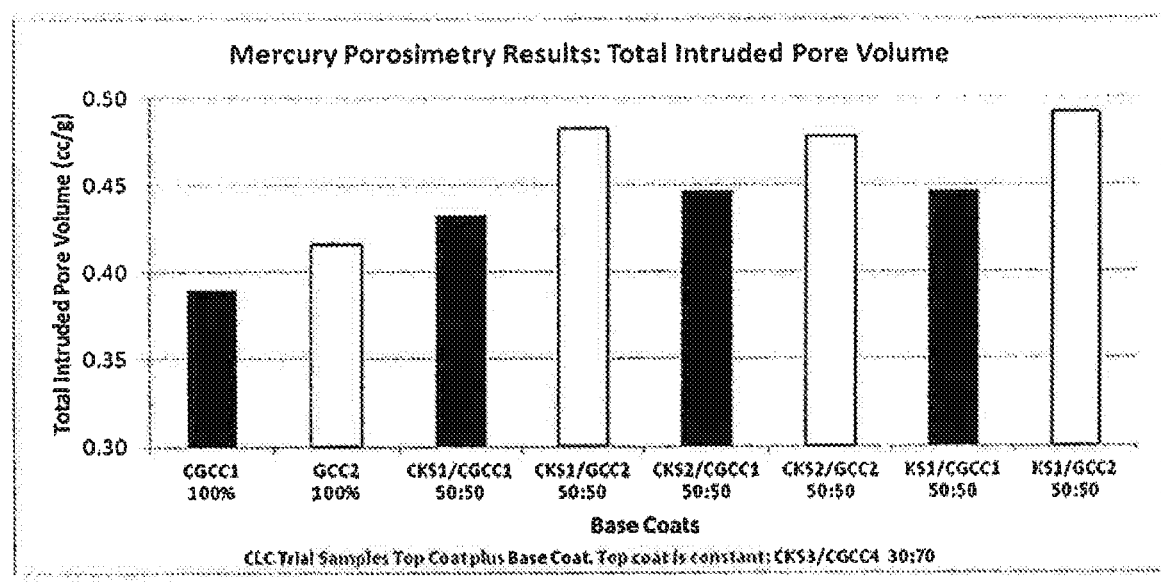
FIG. 20 is a is a graph showing mercury porosimetry for coating composition samples.

The sample coated paper substrates were tested for mercury porosity. FIG. 20 shows mercury porosity results for the coated paper substrates. Mercury porosimetry is a widely used technique for characterizing pore size distributions and pore volume measurements. Mercury does not wet the paper surface. In this test method, mercury is intruded into the sample by increasing pressure in discrete steps. The volume of mercury intruded in the pore structure correlates to the pore volume and pore size distribution.

As shown in FIG. 20, different clay-carbonate pigments selected according to their distinct physical properties gave significantly different coating structures. The total intruded pore volume results are dependent (sometimes significantly) on the base coat pigment blends. Some embodiments result in a pore volume ranging from 0.4 to 0.6 cubic centimeters per gram ($cm^3/g$), for example, ranging from 0.4 to 0.41 $cm^3/g$, 0.41 to 0.42 $cm^3/g$, 0.42 to 0.43 $cm^3/g$, 0.43 to 0.44 $cm^3/g$, 0.44 to 0.45 $cm^3/g$, 0.45 to 0.46 $cm^3/g$, 0.46 to 0.47 $cm^3/g$, 0.47 to 0.48 $cm^3/g$, 0.48 to 0.49 $cm^3/g$, 0.49 to 0.50 $cm^3/g$, 0.50 to 0.51 $cm^3/g$, 0.51 to 0.52 $cm^3/g$, 0.52 to 0.53 $cm^3/g$, 0.53 to 0.54 $cm^3/g$, 0.54 to 0.55 $cm^3/g$, 0.55 to 0.56 $cm^3/g$, 0.56 to 0.57 $cm^3/g$, 0.57 to 0.58 $cm^3/g$, 0.58 to 0.59 $cm^3/g$, or 0.59 to 0.60 $cm^3/g$.

The coating pore structure is mainly determined by the base coat formulations. Total intruded volume results showed coating structure differences caused due to basecoat blends. FIG. 20 shows that the narrow particle size distribution coarser carbonate pigments like GCC2 In the base coats bring greater structuring capabilities. By replacing CGCC1 with GCC2 in the base coats, higher pore volume was obtained. The overall increase in pore volume may be beneficial for reducing flaking and cracking tendency of the coatings. Mercury porosimetry results also correlate to the bulk results reported in FIG. 19. While not wishing to be bound by theory, it appears that bulkier coating structures having higher pore volume may tend to reduce the stress exerted by the coating layers during bending or folding operations. Thus, the results show that it may be possible to modulate the base coat formulations to achieve desired coating structure and folding ability.

Other embodiments will be apparent to those skilled in the art from consideration of the specification and practice of the embodiments disclosed herein. It is intended that the specification and examples be considered as exemplary only.

What is claimed is:

1. A coating composition comprising:
   kaolin having a shape factor less than about 70; and
   calcium carbonate having a $d_{50}$ of at least about 2.4 microns, wherein less than 70% by weight and greater than 60% by weight of particles of the calcium carbonate have an equivalent spherical diameter less than 2 microns.

2. The coating composition of claim 1, further comprising a thickener.

3. The coating composition of claim 2, wherein the thickener is present in an amount ranging from about 0.1% to about 0.9% by active dry weight of the coating composition.

4. The coating composition of claim 2, wherein the thickener is selected from the group consisting of alkali-soluble emulsion polyacrylate thickeners, hydrophobically-modified alkali-soluble emulsion polyacrylate thickeners, and carboxymethyl cellulose thickeners.

5. The coating composition of claim 1, wherein less than about 30% by weight of the kaolin has an equivalent spherical diameter less than about 0.25 microns.

6. The coating composition of claim 1, wherein the calcium carbonate has a $d_{50}$ of at least about 2.6 microns.

7. The coating composition of claim 1, wherein the calcium carbonate has a steepness factor greater than 32.

8. The coating composition of claim 1, further comprising a binder, wherein the binder comprises at least one of an adhesive binder, a starch binder, a synthetic binder, a polyvinyl acetate-based binder, or an acrylic binder.

9. The coating composition of claim 8, wherein the binder forms from 4% to 30% by weight of a solids content of the coating composition.

10. A paperboard product comprising the coating composition of claim 1 on at least one surface of the paperboard product, wherein the paperboard product has a total weight per unit area ranging from 30 g/m² to 70 g/m².

11. A method of reducing the cracking and/or flaking of a coated paperboard product at a fold, the method comprising:
   i) providing a coating composition on a paperboard product, wherein the coating composition comprises a mixture of a binder, kaolin having a shape factor greater than 50 and less than 70; and
   calcium carbonate, wherein less than 70% by weight and greater than about 60% by weight of the particles of the calcium carbonate have an equivalent spherical diameter less than 2 microns; and
   ii) folding the paperboard product to form a fold, wherein the paperboard product has a higher modulus and a higher stiffness as compared to a second modulus and a second stiffness of a paperboard product coated with a coating composition devoid of the kaolin and the calcium carbonate.

12. The method of claim 11, wherein the coating composition further comprises a thickener in an amount ranging from about 0.1% to about 0.9% by active dry weight of the coating composition.

13. The method of claim 12, wherein the thickener is selected from the group consisting of alkali-soluble emulsion polyacrylate thickeners, hydrophobically-modified alkali-soluble emulsion polyacrylate thickeners, and carboxymethyl cellulose thickeners.

14. The method of claim 11, wherein less than 30% by weight of the kaolin has an equivalent spherical diameter less than about 0.25 microns.

15. The method of claim 11, wherein less than 80% by weight of the kaolin has an equivalent spherical diameter less than about 1 microns.

16. The method of claim 11, wherein less than 70% by weight and greater than 60% by weight of the particles of the calcium carbonate have an equivalent spherical diameter less than 2 microns.

17. The method of claim 11, wherein the binder comprises at least one of an adhesive binder, a starch binder, a synthetic binder, a polyvinyl acetate-based binder, or an acrylic binder.

18. The method of claim 11, wherein the binder forms from 4% to 30% by weight of a solids content of the coating composition.

* * * * *